US008918620B2

(12) United States Patent
Matsumura et al.

(10) Patent No.: US 8,918,620 B2
(45) Date of Patent: Dec. 23, 2014

(54) STORAGE CONTROL APPARATUS, STORAGE SYSTEM AND METHOD

(75) Inventors: Tadashi Matsumura, Kawasaki (JP); Masahiro Yoshida, Kawasaki (JP); Kenji Uchiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 839 days.

(21) Appl. No.: 13/159,853

(22) Filed: Jun. 14, 2011

(65) Prior Publication Data

US 2011/0314220 A1    Dec. 22, 2011

(30) Foreign Application Priority Data

Jun. 21, 2010 (JP) .................................. 2010-140601

(51) Int. Cl.
*G06F 12/00* (2006.01)
*G06F 3/06* (2006.01)
*G06F 13/10* (2006.01)

(52) U.S. Cl.
CPC ............... *G06F 3/06* (2013.01); *G06F 3/0622* (2013.01); *G06F 3/0611* (2013.01); *G06F 12/00* (2013.01); *G06F 13/10* (2013.01); *Y02B 60/1225* (2013.01); *Y02B 60/1228* (2013.01)
USPC ..... 711/202; 711/203; 711/114; 711/E12.103

(58) Field of Classification Search
CPC ..... G06F 3/0611; G06F 3/0622; G06F 12/02; G06F 3/06; G06F 12/00; G06F 13/10; Y02B 60/1225; G02B 60/1228
USPC .................. 711/202, 203, 114, 154, E12.001, 711/E12.103
See application file for complete search history.

(56) References Cited

U.S. PATENT DOCUMENTS

| 8,356,139 B2 * | 1/2013 | Ouchi ........................... 711/114 |
| 8,516,206 B2 * | 8/2013 | Yoshida et al. ............... 711/158 |
| 8,578,076 B2 * | 11/2013 | van der Linden et al. ...... 710/72 |
| 8,656,099 B2 * | 2/2014 | Saito et al. ..................... 711/114 |
| 2007/0294552 A1 | 12/2007 | Kakihara et al. |
| 2010/0005261 A1 | 1/2010 | Shiga et al. |

FOREIGN PATENT DOCUMENTS

| JP | 2005-512232 | 4/2005 |
| JP | 2007-219703 | 8/2007 |
| JP | 2008-003719 | 1/2008 |
| JP | 2009-110451 | 5/2009 |
| JP | 2010-015446 | 1/2010 |
| WO | 03/050707 | 6/2003 |

OTHER PUBLICATIONS

Japanese Notification of Reasons for Refusal dated Dec. 17, 2013 in Japanese Patent Application 2010-140601.

* cited by examiner

*Primary Examiner* — Pierre-Michel Bataille
(74) *Attorney, Agent, or Firm* — Staas & Halsey LLP

(57) ABSTRACT

A storage control apparatus includes a controller configured to control to convert an access to logical volume into an access to associated RAID group in response to an access to the corresponding virtual volume on the basis of access conversion information, monitor frequency of access to each of logical volumes, select a logical volume on the basis of the monitored frequency of access, move data stored in a RAID group corresponding to the selected logical volume to a different RAID group corresponding to a logical volume to be a data shift destination, and update the access conversion information to convert access to the RAID group corresponding to the selected logical volume into access to the different RAID group.

17 Claims, 23 Drawing Sheets

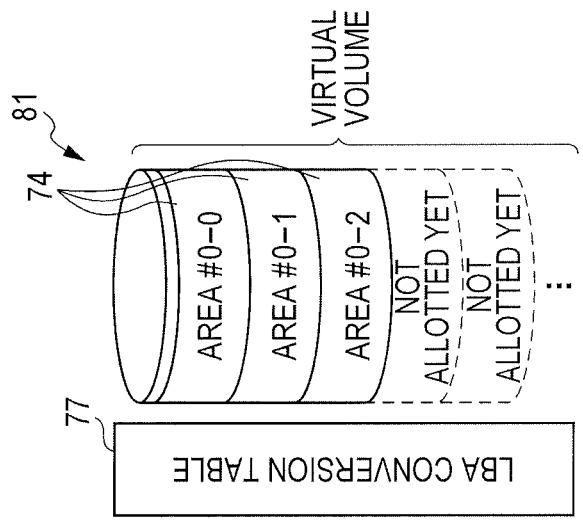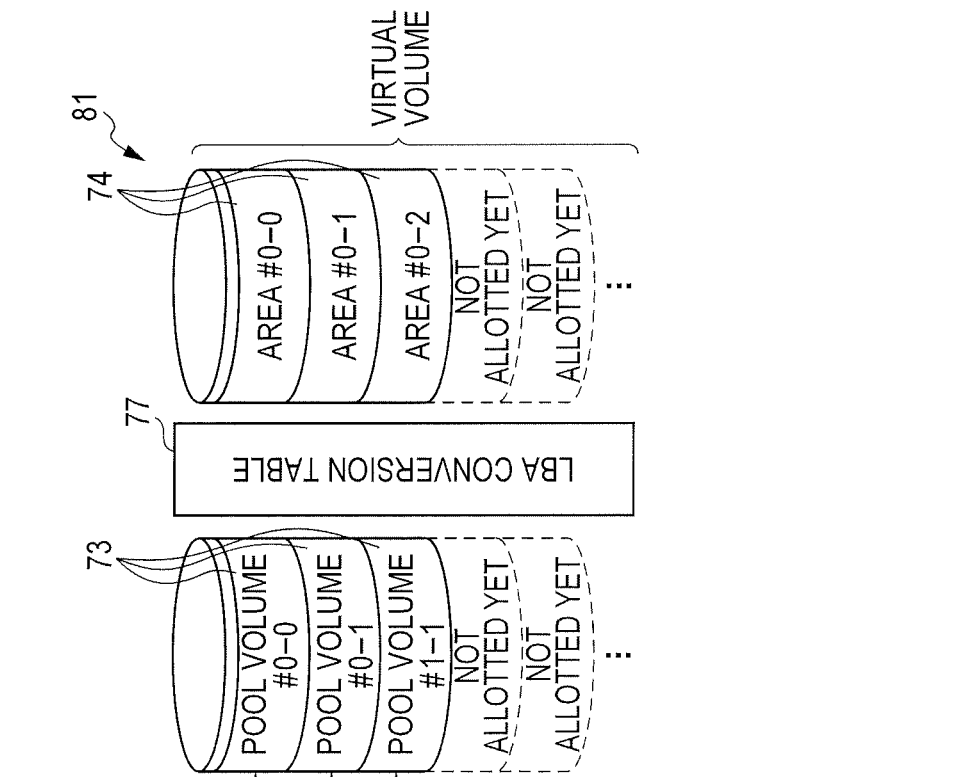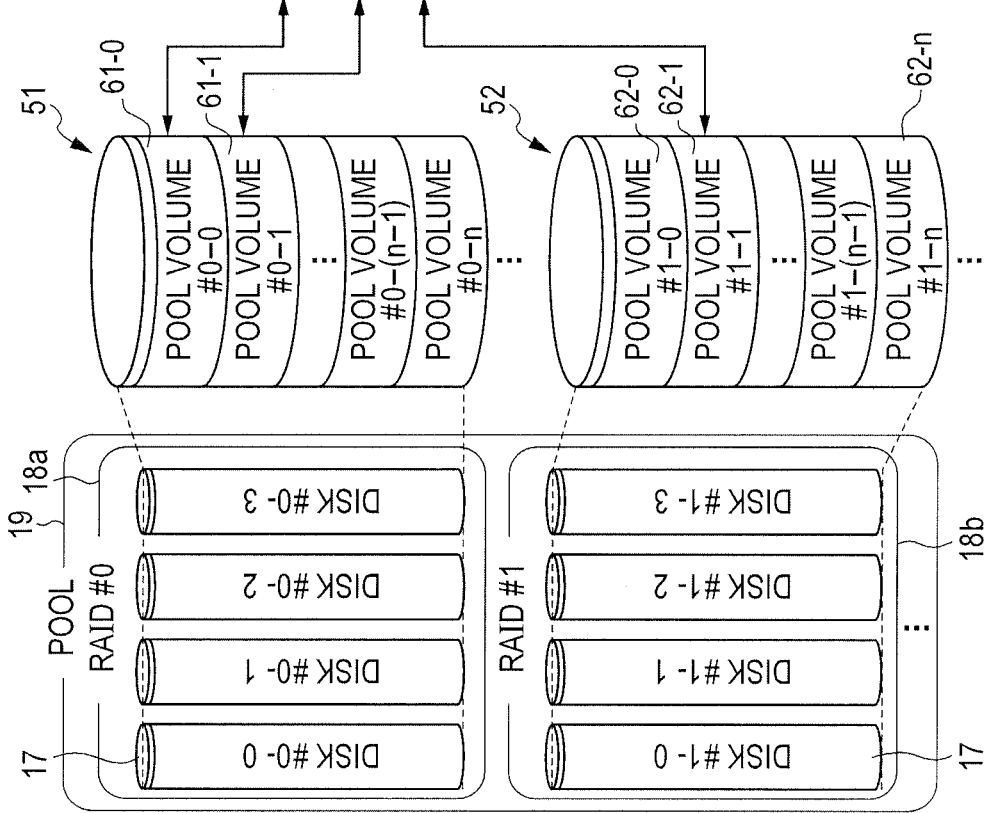

| POOL VOLUME | POOL VOLUME LBA | VIRTUAL VOLUME | VIRTUAL LBA |
|---|---|---|---|
| Pool Volume#0-0 | PV LBA#0-0 | Virtual Volume#0 | Virtual LBA#0-0 |
| Pool Volume#0-1 | PV LBA#0-1 | Virtual Volume#1 | Virtual LBA#1-0 |
| Pool Volume#0-2 | PV LBA#0-2 | Non (NOT ALLOTTED YET) | Non (NOT ALLOTTED YET) |
| Pool Volume#0-3 | PV LBA#0-3 | Non (NOT ALLOTTED YET) | Non (NOT ALLOTTED YET) |
| : | : | : | : |
| Pool Volume#0-n | PV LBA#0-n | Virtual Volume#n | Virtual LBA#n-0 |
| Pool Volume#1-0 | PV LBA#1-0 | Virtual Volume#0 | Virtual LBA#0-1 |
| Pool Volume#1-1 | PV LBA#1-1 | Virtual Volume#2 | Virtual LBA#2-0 |
| Pool Volume#1-2 | PV LBA#1-2 | Non (NOT ALLOTTED YET) | Non (NOT ALLOTTED YET) |
| Pool Volume#1-3 | PV LBA#1-3 | Non (NOT ALLOTTED YET) | Non (NOT ALLOTTED YET) |
| : | : | : | : |
| Pool Volume#1-n | PV LBA#1-n | Virtual Volume#n | Virtual LBA#n-1 |
| Pool Volume#2-0 | PV LBA#2-0 | Virtual Volume#0 | Virtual LBA#0-2 |
| Pool Volume#2-1 | PV LBA#2-1 | Virtual Volume#2 | Virtual LBA#2-1 |
| Pool Volume#2-2 | PV LBA#2-2 | Non (NOT ALLOTTED YET) | Non (NOT ALLOTTED YET) |
| Pool Volume#2-3 | PV LBA#2-3 | Non (NOT ALLOTTED YET) | Non (NOT ALLOTTED YET) |
| : | : | : | : |
| Pool Volume#2-n | PV LBA#2-n | Non (NOT ALLOTTED YET) | Non (NOT ALLOTTED YET) |
| : | : | : | : |

FIG. 6

| POOL VOLUME | VIRTUAL VOLUME | LATEST ACCESS TIME | |
|---|---|---|---|
| Pool Volume#0-0 | Virtual Volume#0 | AAAAAAA | |
| Pool Volume#0-1 | Virtual Volume#1 | BBBBBBBB | |
| Pool Volume#0-2 | Non (NOT ALLOTTED YET) | 00000000 | |
| Pool Volume#0-3 | Non (NOT ALLOTTED YET) | 00000000 | |
| : | : | : | |
| Pool Volume#0-n | Virtual Volume#n | CCCCCCCC | |
| Pool Volume#1-0 | Virtual Volume#0 | AAAAAAA | |
| Pool Volume#1-1 | Virtual Volume#2 | 00000000 | ←WITHOUT ACCESS |
| Pool Volume#1-2 | Non (NOT ALLOTTED YET) | 00000000 | |
| Pool Volume#1-3 | Non (NOT ALLOTTED YET) | 00000000 | |
| : | : | : | |
| Pool Volume#1-n | Virtual Volume#n | 00000000 | ←WITHOUT ACCESS |
| Pool Volume#2-0 | Virtual Volume#0 | 00000000 | ←WITHOUT ACCESS |
| Pool Volume#2-1 | Virtual Volume#2 | 00000000 | ←WITHOUT ACCESS |
| Pool Volume#2-2 | Non (NOT ALLOTTED YET) | 00000000 | |
| Pool Volume#2-3 | Non (NOT ALLOTTED YET) | 00000000 | |
| : | : | : | |
| Pool Volume#2-n | Non (NOT ALLOTTED YET) | 00000000 | |
| : | : | : | |

| POOL VOLUME | POOL VOLUME LBA | VIRTUAL VOLUME | VIRTUAL LBA |
|---|---|---|---|
| Pool Volume#0-0 | PV LBA#0-0 | Virtual Volume#0 | Virtual LBA#0-0 |
| Pool Volume#0-1 | PV LBA#0-1 | Virtual Volume#1 | Virtual LBA#1-0 |
| Pool Volume#0-2 | PV LBA#0-2 | Virtual Volume#0 | Virtual LBA#0-1 |
| Pool Volume#0-3 | PV LBA#0-3 | Non (NOT ALLOTTED YET) | Non (NOT ALLOTTED YET) |
| ⋮ | ⋮ | ⋮ | ⋮ |
| Pool Volume#0-n | PV LBA#0-n | Virtual Volume#n | Virtual LBA#n-0 |
| Pool Volume#1-0 | PV LBA#1-0 | Non (NOT ALLOTTED YET) | Non (NOT ALLOTTED YET) |
| Pool Volume#1-1 | PV LBA#1-1 | Non (NOT ALLOTTED YET) | Non (NOT ALLOTTED YET) |
| Pool Volume#1-2 | PV LBA#1-2 | Non (NOT ALLOTTED YET) | Non (NOT ALLOTTED YET) |
| Pool Volume#1-3 | PV LBA#1-3 | Non (NOT ALLOTTED YET) | Non (NOT ALLOTTED YET) |
| ⋮ | ⋮ | ⋮ | ⋮ |
| Pool Volume#1-n | PV LBA#1-n | Non (NOT ALLOTTED YET) | Non (NOT ALLOTTED YET) |
| Pool Volume#2-0 | PV LBA#2-0 | Virtual Volume#0 | Virtual LBA#0-2 |
| Pool Volume#2-1 | PV LBA#2-1 | Virtual Volume#2 | Virtual LBA#2-1 |
| Pool Volume#2-2 | PV LBA#2-2 | Virtual Volume#2 | Virtual LBA#2-0 |
| Pool Volume#2-3 | PV LBA#2-3 | Virtual Volume#n | Virtual LBA#n-1 |
| ⋮ | ⋮ | ⋮ | ⋮ |
| Pool Volume#2-n | PV LBA#2-n | Non (NOT ALLOTTED YET) | Non (NOT ALLOTTED YET) |
| ⋮ | ⋮ | ⋮ | ⋮ |

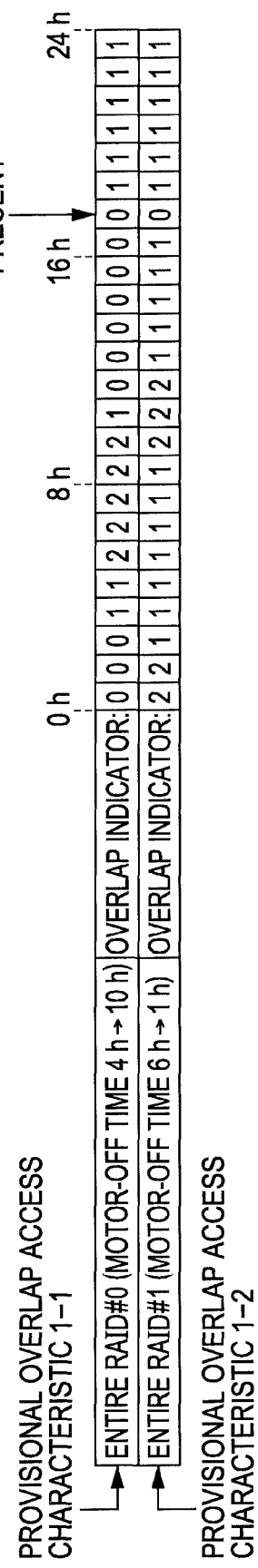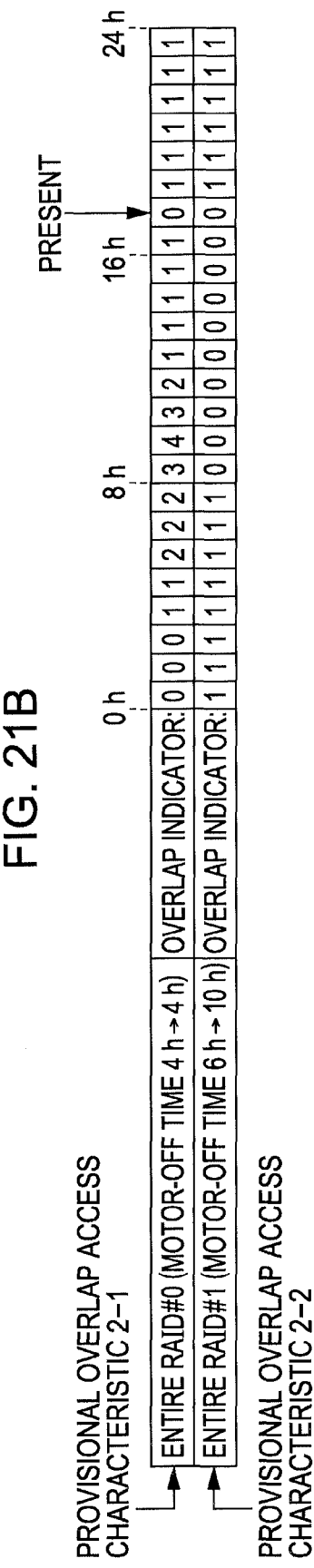

STORAGE CONTROL APPARATUS, STORAGE SYSTEM AND METHOD

CROSS-REFERENCE TO RELATED APPLICATION

This application is based upon and claims the benefit of priority of the prior Japanese Patent Application No. 2010-140601, filed on Jun. 21, 2010, the entire contents of which are incorporated herein by reference.

FIELD

The embodiments discussed herein are related to a storage control apparatus, a storage system and a storage control method.

BACKGROUND

A MAID (Massive Array of Idle Disks) technology, e.g., is known as a method for controlling a storage device. The MAID technology is to shift a disk of a storage device of a RAID (Redundant Arrays of Inexpensive Disks) apparatus (RAID group) without being accessed to an idling state so as to suppress power consumption of the storage device. There is a method for controlling a disk motor of every RAID group by using the MAID technology. As a motor of a disk (disk device) in the RAID group is kept off for a longer period of time, the storage device may more reduce power consumption. Thus, an operation such that one and the same host or server accesses a logical volume in one RAID group and turns off a motor of a disk in another RAID group is disclosed. Further, e.g., an operation in a case where a volume in one RAID group is used by a plurality of servers such that the respective servers access a logical volume in the RAID group in similar periods of time is disclosed.

In a storage device group in which a virtual volume is built through Thin Provisioning, a logical volume is assigned from a pool area in a case where the virtual volume runs short of capacity. The pool area ordinarily includes RAID groups of individual levels, and some logical volume which forms each of the RAID groups is acquired as an area of the virtual volume. The number of RAID groups allotted to the virtual volume tends to increase if a file system adds and deletes data to and from the virtual volume repeatedly. As the number of the allotted RAID groups increases, the number of the storage devices grows somewhat larger with respect to an amount of frequently accessed data, resulting in an increase in power consumption.

The following are reference documents.

[Patent Document 1] Japanese Laid-open Patent Publication No. 2009-110451

[Patent Document 2] PCT International Application Publication No. WO2003/050707

SUMMARY

According to an aspect of the embodiment, a storage control apparatus for controlling a plurality of RAID groups each including a plurality of storage devices, the storage control apparatus includes a controller configured to control to associate a plurality of logical volumes with each of the RAID groups, and allot at least one of the plurality of logical volumes to a virtual volume, and a memory configured to store a piece of access conversion information specifying conversion of access to each of the plurality of logical volumes into access to the associated RAID group, wherein the controller controls to convert the access to the logical volume into the access to the associated RAID group in response to the access to the corresponding virtual volume on the basis of the access conversion information, monitor frequency of access to each of the logical volumes, select a logical volume on the basis of the monitored frequency of access, move data stored in a RAID group corresponding to the selected logical volume to a different RAID group corresponding to a logical volume to be a data shift destination, and update the access conversion information to convert access to the RAID group corresponding to the selected logical volume into access to the different RAID group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A-2C illustrate a relationship between a virtual volume which may be recognized by a server and logical volumes associated with a RAID group;

FIG. 5 illustrates an exemplary LBA conversion table;

FIG. 6 is an exemplary access management table made by an access analyzing unit;

FIG. 9 illustrates an LBA conversion table having been rewritten by a rearrangement controller;

FIGS. 21A and 21B illustrate a provisional overlap access characteristic in the analysis of the access flag map illustrated in FIG. 14A.

DESCRIPTION OF EMBODIMENTS

Preferred embodiments of the present techniques will be explained with reference to accompanying drawings.

Figure 1:
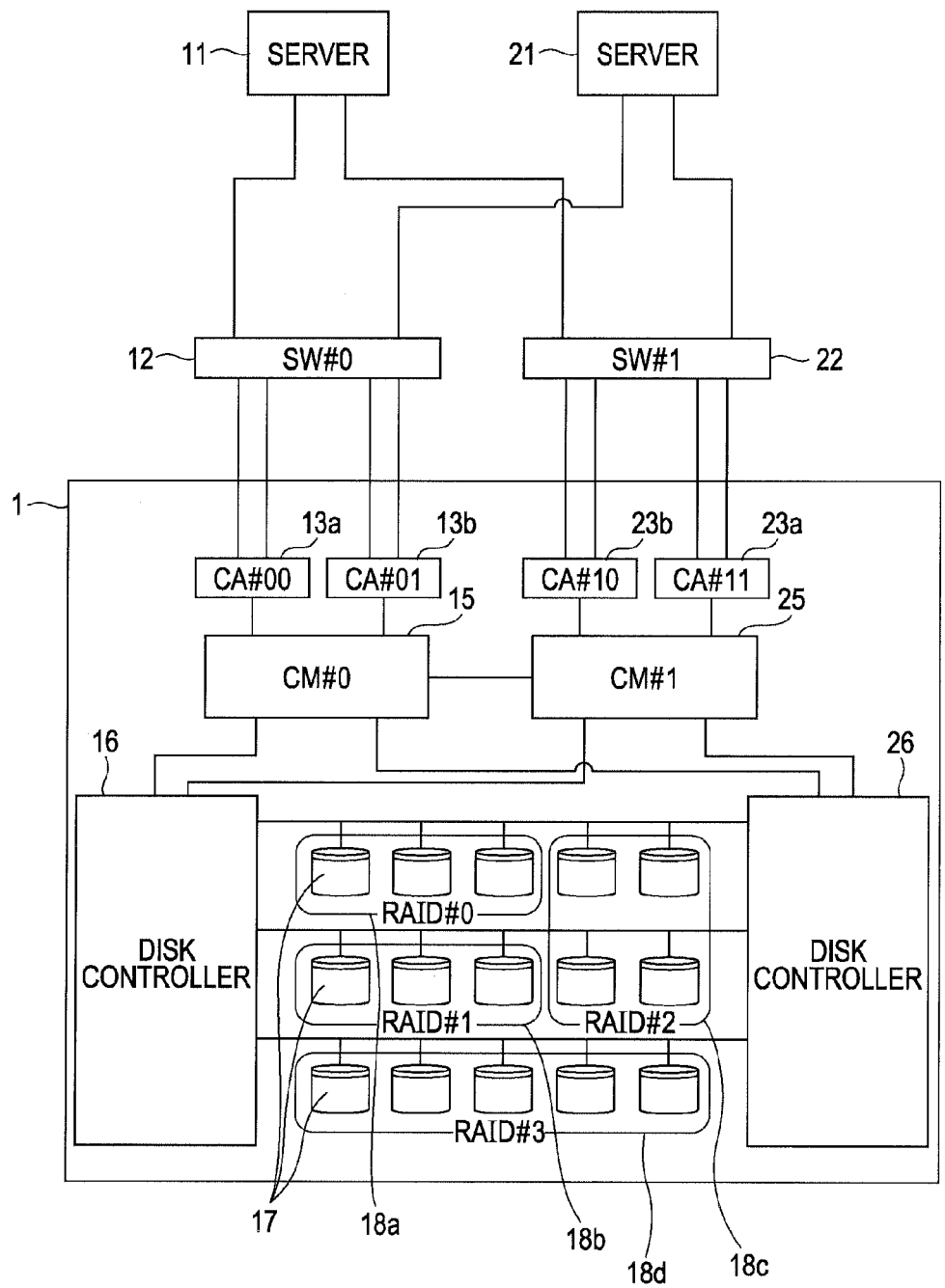
FIG. 1 illustrates an exemplary physical configuration of a storage system provided with a storage control apparatus of a first embodiment.
Figure 3:
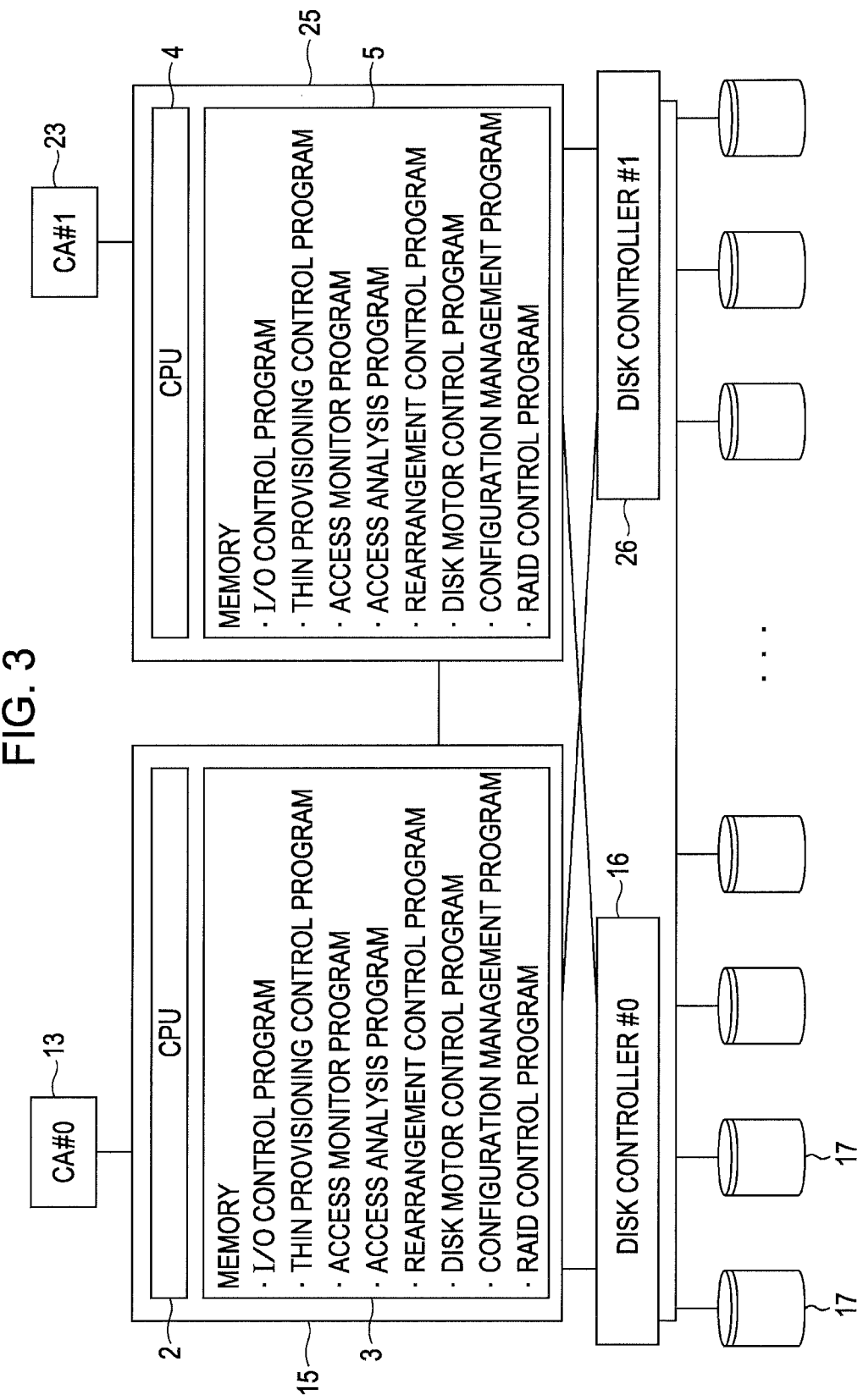
FIG. 3 illustrates a physical configuration of the storage control apparatus of the first embodiment.

FIGS. 1-3 illustrate a storage control apparatus of a first embodiment.

FIG. 1 illustrates an exemplary physical configuration of a storage system 1 provided with storage control apparatuses 15 and 25 of the first embodiment. The storage system 1 includes the storage control apparatuses 15 and 25, channel adaptors 13a, 13b, 23a and 23b, disk controllers 16 and 26, and RAID groups #0-3 illustrated as 18a-18d.

The storage control apparatuses 15 (CM#0) and 25 (CM#1) are connected to the four RAID apparatuses (RAID groups) #0-3 (illustrated as 18a-18d) through the disk controllers 16 and 26. Each of the RAID apparatuses 18a-18d includes a plurality of storage devices 17. The storage devices 17 each are a device which records and reproduces data by driving storage media, and is, e.g., a hard disk drive (HDD). The HDD has disk media and a spindle motor which rotates the disk media.

The disk motors are controlled on the basis of I/O (Input/Output) access on a RAID group-by-Raid group basis, not on a volume-by-volume basis of a volume which may be recognized by a host or a server connected to the storage device. If one of the volumes is accessed in a RAID group, motors of disks of the RAID group including the accessed volume are turned on. Further, if any volume in a RAID group turns not to be accessed in a particular condition, motors of disks in the RAID group are tuned off.

Although the two storage control apparatuses 15 and 25 of the embodiment manage the RAID groups 18a-18d for ensuring redundancy, the number of the storage control apparatuses is not limited to the above.

The storage control apparatus 15 is connected to the channel adaptors 13a and 13b. The channel adaptors 13a and 13b control exchange of data between the storage control apparatus 15 and servers 11 and 21. Data is exchanged between the servers 11 and 21 and the storage control apparatus 15 through a switch 12 (SW#0).

The storage control apparatus 25 is connected to the channel adaptors 23a and 23b. The channel adaptors 23a and 23b control exchange of data between the storage control apparatus 25 and the servers 11 and 21. Data may be exchanged between the servers 11 and 21 and the storage control apparatus 15 through a switch 22 (SW#1).

Although the storage control apparatuses 15 and 25 exchange data with the two servers 11 and 21, the number of the servers which exchange data with the storage control apparatuses is not limited to the above. The switches 12 and 22 may be provided with a name server function, a routing function, etc.

The RAID groups 18a-18b each store therein data to be accessed by the servers 11 and 21. The storage control apparatuses 15 and 25 associate at least one logical volume (not illustrated) with each of the RAID groups 18a-18d.

The logical volume mentioned here is a logical storage area set across the plural storage devices possessed by the RAID apparatuses 18a-18d on the basis of a RAID standard. A physical block address practically allotted to each of the storage devices is allotted to the logical volume.

A logical volume is allotted to a virtual volume that the servers 11 and 21 may recognize as one definite data storage area by the use of a conversion table. A logical block address of the virtual volume and a logical block address of the logical volume are laid out on the conversion table. A logical volume associated with one RAID group may be allotted to one virtual volume, or a logical volume associated across plural RAID groups may be allotted to one virtual volume as well.

In order to set (define) a virtual volume, e.g., a system administrator connects a storage management tool to the storage control apparatus 15 through an interface which is not illustrated.

Incidentally, between a logical block address (LBA) of a logical volume and a physical block address practically allotted to each of the storage devices, e.g., another LBA may further be associated. Further, still another LBA may be associated between the LBA of the logical volume and an LBA of a virtual volume.

A virtual volume of the embodiment is a virtual volume built through thin provisioning. A plurality of logical volumes set across a plurality of storage devices is used as pool volumes which form a pool area (storage pool). If the virtual volume is accessed, one of the logical volumes in the pool area which is not allotted yet to the virtual volume is allotted. The pool area ordinarily includes RAID groups of individual levels. A logical volume not allotted yet to the virtual volume in at least one of logical volumes forming each of the RAID groups is acquired as an area of the virtual volume. Upon acquiring a new logical volume as described here, one virtual volume may include logical volumes associated with a plurality of RAID groups. Allotment of a logical volume to a virtual volume is implemented as a logical block address set to the virtual volume is associated with a logical block address set to the logical volume by means of an LBA conversion table 77 described later.

Data to be accessed by the servers 11 and 21 includes where the data to be accessed is stored, a piece of information for distinguishing a reading instruction and a writing instruction, and a piece of information of an object to which the data is written.

FIGS. 2A-2C illustrate a relationship between a virtual volume that the servers may recognize and logical volumes associated with the RAID groups.

FIG. 2A schematically illustrates a plurality of RAID groups prepared as a storage pool. FIG. 2A indicates RAID groups which are a RAID #0 (illustrated as 18a) and a RAID #1 (illustrated as 18b) in a storage pool 19. The RAID groups 18a-18b each include a plurality of storage devices 17.

FIG. 2B illustrates a pool volume group #0 (illustrated as a 51) set on the RAID group (#0) 18a and a pool volume group #1 (illustrated as 52) set on the RAID group (#1) 18b. The pool volume group (#0) 51 has pool volumes (logical volumes) #0-0 through #0-n (illustrated as 61-0 through 61-n). The pool volume group #1 has pool volumes (logical volumes) #1-0 through #1-n. The pool volumes #0-0 through #0-n of the pool volume group #0 each are set on a plurality of storage devices 17 included in the RAID 18a. The pool volumes #1-0 through #1-n of the pool volume group #1 each are set on a plurality of storage devices 17 included in the RAID 18b.

FIG. 2C schematically illustrates an exemplary relationship between the pool volumes and a virtual volume. FIG. 2C illustrates a group 73 including the pool volumes #0-0 and #0-1 in the pool volume group 51 and the pool volume #1-1 in the pool volume group 52 are allotted to areas #0-0, #0-1 and #0-2 (illustrated as 74) in a virtual volume 81 that the server 11 recognizes.

Incidentally, interfaces between the areas (#0-0, #0-1 and #0-2) 74 in the virtual volume 81 are illustrated in FIG. 2C for convenience of explanation. The interfaces between the areas #0-0, #0-1 and #0-2 are not recognizable from the server side as a practical matter. The server 11 accesses a pool volume by accessing a virtual LBA in the LBA conversion table 77, and further accesses a physical volume set on the respective storage devices 17 by means of a logical block address-physical block address conversion table (not illustrated). In FIG. 2C, areas in the pool volumes illustrated in FIG. 2B not allotted to the server yet are indicated as "not allotted yet". The entire area of the virtual volume 81 illustrated in FIG. 2C including the allotted pool volumes and the pool volumes not allotted yet is recognized by the server side.

FIG. 3 illustrates physical configurations of the storage control apparatuses 15 and 25 of the first embodiment. The storage control apparatus 15 has a controller 2 and a memory 3, and the storage control apparatus 25 has a controller 4 and a memory 5. The controller 2 and the memory 3 of the storage control apparatus 15 and the controller 4 and the memory 5 of the storage control apparatus 25 are of same functions, respectively. Thus, the controller 2 and the memory 3 of the storage control apparatus 15 will mainly be explained.

The memory 3 stores therein a program run by the controller 2, a piece of information in progress processed by the controller 2, a conversion table read and written to by the controller 2, etc. The memory 3 is, e.g., a random access memory (RAM), a read only memory (ROM), etc. The memory 3 stores therein various programs for implementing functions of an I/O controller, a thin provisioning controller (volume controller), an access monitoring unit, an access analyzing unit, a rearrangement controller (a data movement controller and an access conversion information updating unit), a disk motor controller, a configuration management unit and a RAID controller described later.

The controller 2 works as a controller module 115 to be explained with reference to FIG. 4 by running a program stored in the memory 3. The controller 4 similarly works as a controller module 125 to be explained with reference to FIG. 4. The controller 2 is, e.g., a CPU (Central Processing Unit).

Figure 4:
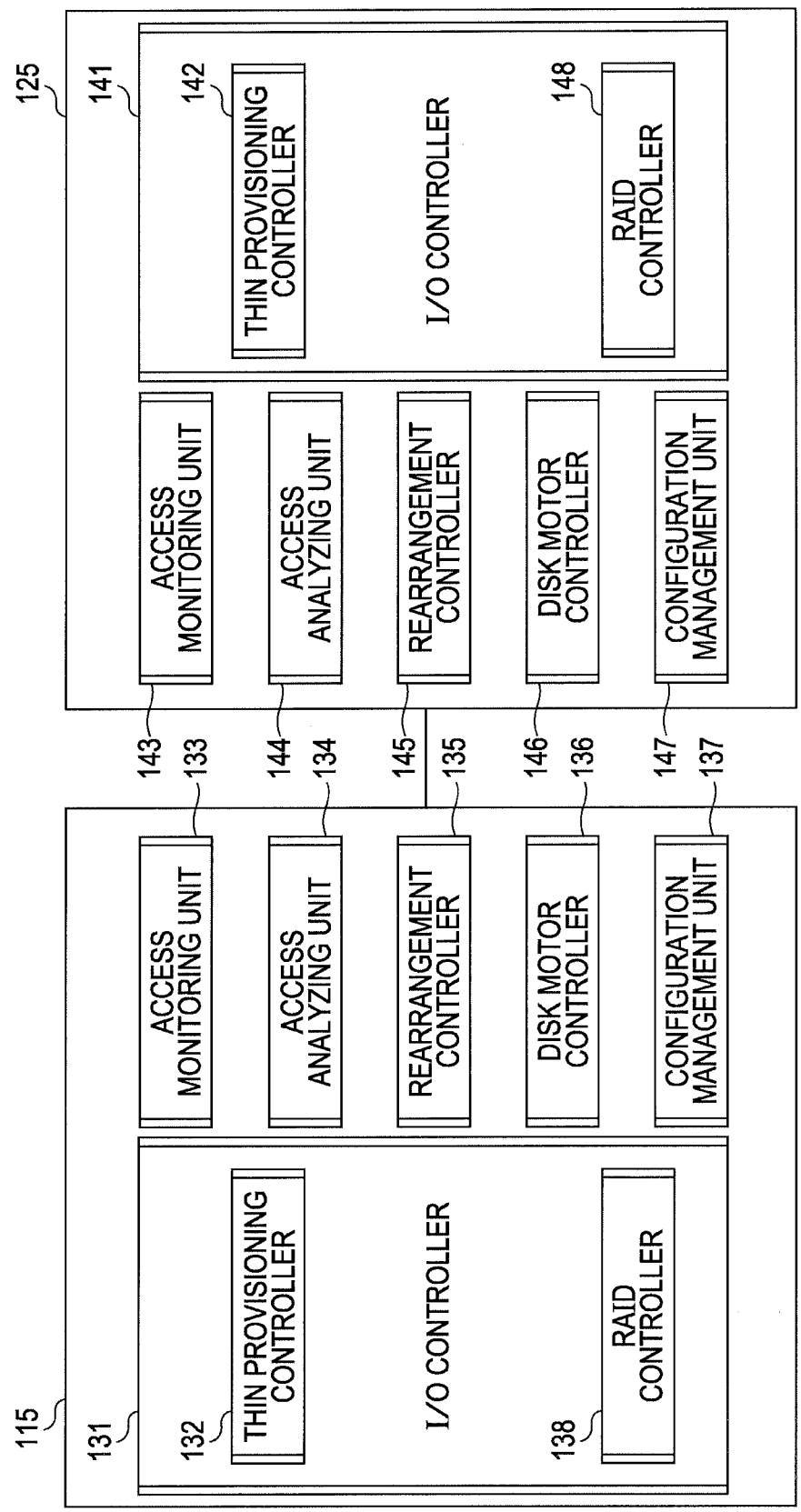
FIG. 4 is a processing block diagram for illustrating a functional configuration of a storage controller module of the storage control apparatus of the first embodiment.

FIG. 4 is a processing block diagram for illustrating functional configurations of storage controller modules of the storage control apparatuses of the first embodiment.

The controller modules 115 and 125 do, in order that all data in the pool volumes of similar characteristics of access from the server is included in one and the same RAID group, move the data to one of the logical volumes (pool volumes) in the plural RAID groups, and rewrites an association between the logical volume in which the data is arranged after the data movement and the area included in the virtual volume.

The controller module 115 has an I/O controller 131, an access monitoring unit 133, an access analyzing unit 134, a rearrangement controller (a data movement controller and an access conversion information updating unit) 135, a disk motor controller 136 and a configuration management unit 137. The controller module 125 has an I/O controller 141, an access monitoring unit 143, an access analyzing unit 144, a rearrangement controller 145, a disk motor controller 146 and a configuration management unit 147.

The I/O controller 131, the access monitoring unit 133, the access analyzing unit 134, the rearrangement controller 135, the disk motor controller 136 and the configuration management unit 137 of the controller module 115 and the I/O controller 141, the access monitoring unit 143, the access analyzing unit 144, the rearrangement controller 145, the disk motor controller 146 and the configuration management unit 147 of the controller module 125 are of same functions, respectively. Thus, each of the functional portions of the controller module 115 will mainly be explained.

The I/O controller 131 controls access from the servers 11 and 21 to data recorded in an area of the pool volumes associated with each of the RAID groups 18a-18d.

The I/O controller 131 has a RAID controller 138. The RAID controller 138 sets the RAID groups 18a-18d each having at least one pool volume set across a plurality of storage devices.

The I/O controller 131 has a thin provisioning controller (virtual volume controller) 132.

The thin provisioning controller 132 allots an LBA of the pool volume associated with each of the RAID groups 18a-18d to the logical block address (LBA) of the virtual volume that the servers 11 and 21 recognize. The I/O controller 131 converts access to the LBA of the virtual volume into access to the LBA of the pool volume on the basis of the above allotment. The I/O controller 131 converts the access to the LBA of the virtual volume into the access to the LBA of the pool volume with reference to the LBA conversion table 77 produced by the thin provisioning controller 132 described later.

FIG. 5 illustrates an exemplary LBA conversion table. The LBA conversion table 77a illustrated in FIG. 5 defines allotments of LBAs of pool volumes to LBAs of virtual volumes. The LBA conversion table 77a is formed by four items named "pool volume", "pool volume LBA", "virtual volume" and "virtual volume LBA". As to values in the column of the pool volume, e.g., Pool Volume #0-0 represents a 0-th pool volume of the RAID group #0 (incidentally, e.g., the 0-th pool volume of the RAID group #0 may be indicated as "pool volume #0-0" in some cases in the specification). As to values in the column of the pool volume LBA, e.g., PV LBA #0-0 represents the LBA of the 0-th pool volume of the RAID group #0. As to values in the column of the virtual volume, e.g., the table indicates that the 0-th pool volume of the RAID group #0 is allotted to the Virtual Volume #0, and that the second pool volume of the RAID group #0 is not allotted yet. As to values in the column of the virtual volume LBA, e.g., the table indicates that the LBA of the 0-th pool volume of the RAID group #0 is associated with the 0-th Virtual LBA of the virtual volume #0.

Further, if storage capacity practically allotted to the virtual volumes is insufficient, the thin provisioning controller 132 allots some of the pool volumes not allotted yet to the virtual volumes.

The access monitoring unit 133 monitors access from the servers 11 and 21 to the pool volumes on the I/O controller 131. The access monitoring unit 133 monitors, e.g., a virtual volume that the server has accessed, a pool volume corresponding to an area of the accessed virtual volume, and the latest time when the access is done.

The access analyzing unit 134 analyzes an access frequency that the access monitoring unit 133 monitors, and selects from the pool volumes a pool volume that data is moved from and another pool volume that the data is moved to. The pool volume and another pool volume are associated with different RAID apparatuses.

The access analyzing unit 134 records on an access management table pieces of information of the virtual volume that the server 11 or 21 has accessed, the pool volume corresponding to the area of the accessed virtual volume, and the latest time when the access is done. Incidentally, the access monitoring unit 133 may make an access flag map described later instead of the access management table.

FIG. 6 is an exemplary access management table made by the access analyzing unit 134. The access management table 78 illustrated in FIG. 6 is formed by three items named "pool volume", "virtual volume" and "latest access time". The table indicates, e.g., that the 0-th pool volume of the RAID group #0 is allotted to the virtual volume #0 and its latest access time is AAAAAAA. The table indicates that the second pool volume of the RAID group #0 is not allotted (Non). The table indicates that the first pool volume of the RAID group #1 is allotted to the virtual volume #2 after being accessed once by the server or although not being accessed by the server, and that it is not accessed by the server (00000000) though.

The access analyzing unit 134 analyzes recorded pool volumes, virtual volumes and access time. Methods for the analysis may be enumerated, e.g., as follows. (I) The access analyzing unit 134 analyzes whether access has been done within a certain period of time, and selects two or more pool volumes having been accessed within a certain period of time (e.g., one hour, one day, one week, etc.) from the pool volumes belonging to RAID groups different from one another and allotted to the server. (II) The access analyzing unit 134 analyzes whether access was done within a certain period of time, and selects two or more pool volumes not being accessed from the pool volumes belonging to RAID groups different from one another and allotted to the server. The methods (I) and (II) may be taken in series.

The rearrangement controller 135 moves (copies) entire data in one pool volume of the pools selected by the access analyzing unit 134 into a pool volume not allotted yet in a RAID group including other pool volumes. Further, the rearrangement controller 135 rewrites an LBA conversion table between LBAs of the pool volumes related to the movement of the data and the virtual volumes in the LBA conversion table of the thin provisioning controller 132. That is, the rearrangement controller 135 relates the LBA of the pool volume of a data shift origin to the LBA of the virtual volume corresponding to the pool volume of a data shift destination. Further, the rearrangement controller 135 relates the LBA of the volume of the data shift origin to the LBA of the virtual volume corresponding to the volume the data shift destination.

Figure 7:
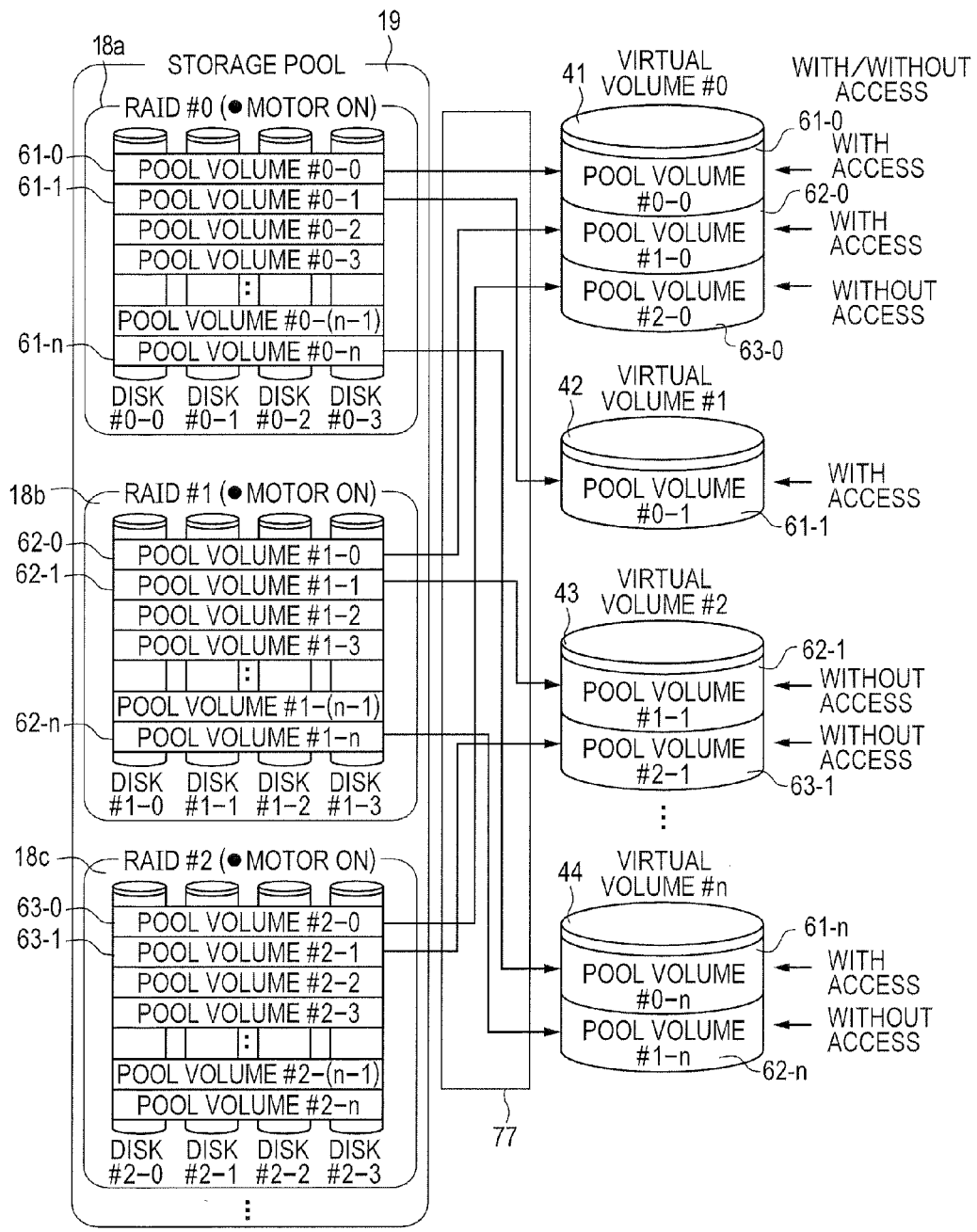
FIG. 7 illustrates rearrangements of data stored in pool volumes.
Figure 8:
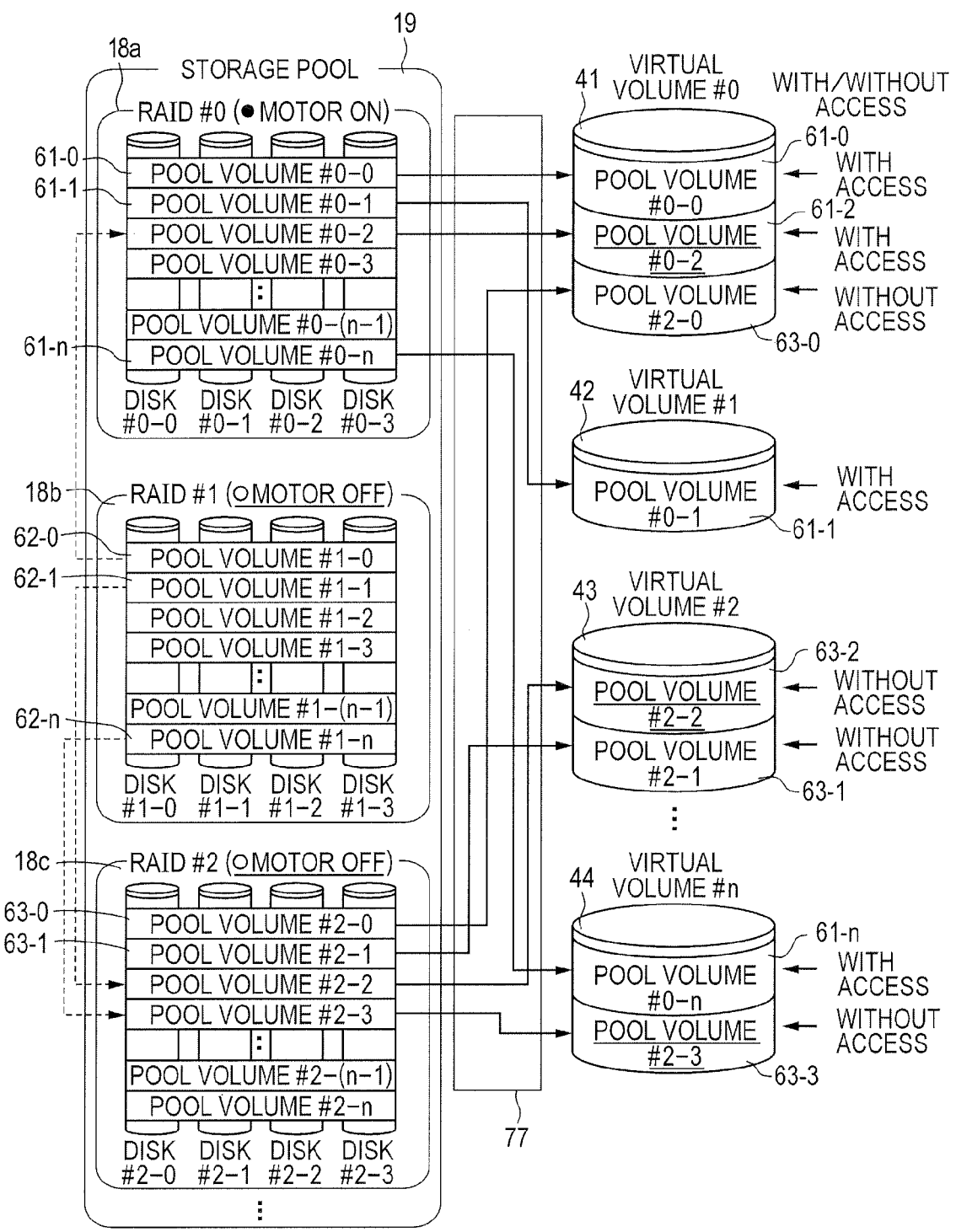
FIG. 8 illustrates rearrangements of data stored in pool volumes.

FIGS. 7-8 illustrate rearrangements of data stored in the pool volumes.

FIG. 7 schematically illustrates an exemplary relationship between a plurality of logical volumes and virtual volumes.

In FIG. 7, virtual volumes #0-#n are built on a plurality of RAID groups. To the virtual volume #0 as illustrated as 41, e.g., allotted are the 0-th pool volume 61-0 of the RAID group #0 (as illustrated as 18a), the 0-th pool volume 62-0 of the RAID group #1 (as illustrated as 18b) and the 0-th pool volume 63-0 of the RAID group #2 (as illustrated as 18c). The first pool volume 61-1 of the RAID group #0 is allotted to the virtual volume #1 (as illustrated as 42). The first pool volume 62-1 of the RAID group #1 and the first pool volume 63-1 of the RAID #2 are allotted to the virtual volume #2 (as illustrated as 43). The n-th pool volume 61-n of the RAID group #0 and the n-th pool volume 62-n of the RAID group #1 are allotted to the virtual volume #n (as illustrated as 44). The server accesses the pool volumes 61-0 of the 0-th of the RAID group #0, the 0-th 62-0 of the RAID group #1, the first 61-1 of the RAID group #0 and the n-th 61-n of the RAID group #0. Meanwhile, the server does not access the pool volumes 63-0 of the 0-th of the RAID #2, the first 62-1 of the RAID group #1, the first 63-1 of the RAID #2 or the n-th 62-n of the RAID group #1. Thus, as being accessed, the storage devices included in the RAID groups #0-#2 each are in a state of being driven (Motor On).

FIG. 8 relates to the plural pool volumes illustrated in FIG. 7 and the virtual volumes corresponding to the pool volumes, and schematically illustrates an exemplary relationship between three volumes to which data is moved on the basis of whether the pool volume is accessed and the virtual volumes. For this example, data in the accessed pool volumes is gathered into the RAID group (#0) 18a, data in the pool volumes which is not accessed is gathered into the RAID (#2) 18c, and the pool volumes not allotted yet are gathered into the RAID group (#1) 18b. That is, move (copy) the data in the 0-th pool volume 62-0 of the RAID group #1 into the second pool volume 61-2 of the RAID group #0, move (copy) the data in the first pool volume 62-1 of the RAID group #1 into the second pool volume 63-2 of the RAID #2, and move (copy) the data in the n-th pool volume 62-n of the RAID group #1 into the third pool volume 63-3 of the RAID #2.

FIG. 9 illustrates the LBA conversion table 77b which is rewritten by the rearrangement controller 135. Rewrite the LBA conversion table as the data moves as described above, and change the allotment of the pool volumes to the virtual volumes.

As the data is moved and the LBA conversion table 77b is rewritten, the storage devices included in the RAID group #1 or #2 come not to be accessed, and the RAID groups #1 and #2 may be stopped from being driven (Motor Off). As only the RAID group #0 is accessed in the RAID groups illustrated in FIG. 8 and it is enough to drive the disks #0-0 through #0-3 only, the storage device group may suppress power consumption. Incidentally, disk motors of some of the disks #1-0 through #1-3 forming the RAID group #1 not being accessed for a certain period of time, although being allotted to the virtual volumes, may be stopped a degree of RAID redundancy. At this time, reading and writing operations are done without delay even in case of access from the server.

The explanation of the controller module 115 will be continued again by the use of FIG. 4.

The disk motor controller 136 controls the disk motors of the plural storage devices 17 included in the RAID groups 18a-18d on the basis of conditions of the servers 11 and 21 in the access to the pool volumes (which pool volumes are accessed and when) recorded by the access monitoring unit 133, so as to control the storage media being driven (e.g., rotations of the disk media). The disk motor controller 136 stops a storage media whose access frequency (access flag) is lower than a threshold from being driven, so as to suppress its power consumption. The disk motor controller 136, e.g., stops a disk motor of an HDD expecting no access for a certain period of time from rotating, so as to suppress its power consumption.

The configuration management unit 137 manages the configuration of the storage system. The configuration management unit 137, e.g., maintains conditions in driving the storage media of the respective storage devices 17 (rotations of the disk media).

Figure 10:
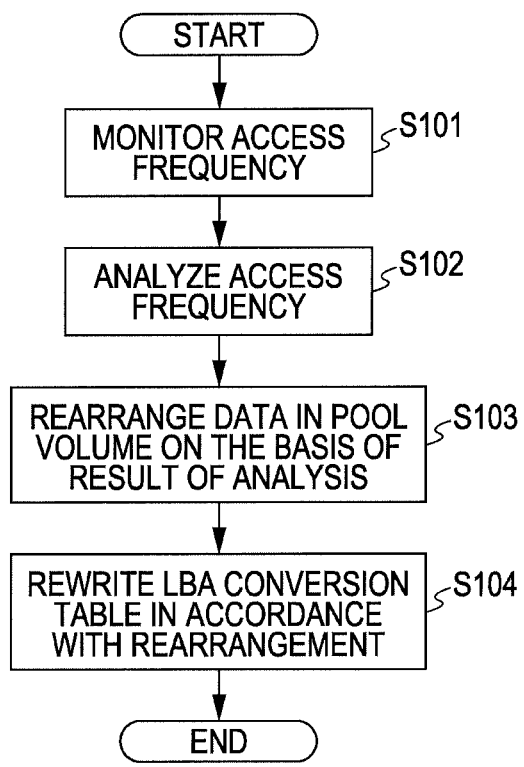
FIG. 10 illustrates a control flow of the storage control apparatus of the first embodiment.

FIG. 10 illustrates a flow of a storage control method using the storage control apparatus of the first embodiment.

To begin with, the access monitoring unit 133 monitors access from the servers 11 and 21 to the pool volumes on the I/O controller 131 (S101). The access monitoring unit 133 monitors, e.g., a virtual volume accessed by the server, a pool volume corresponding to an area of the accessed virtual volume, and the latest time when the access was done.

Then, the access analyzing unit 134 analyzes the virtual volume accessed by the server and monitored by the access monitoring unit 133, the pool volume corresponding to an area of the accessed virtual volume and the latest time when the access was done, and selects from the pool volumes a pool volume to be a data shift origin and a pool volume to be a data shift destination associated with a RAID apparatus different from a RAID apparatus with which the pool volume to be the data shift origin is associated (S102).

Then, the rearrangement controller 135 moves data in the pool volume being the data shift origin selected by the access analyzing unit 134 to the pool volume being the data shift destination (S103).

Then, the rearrangement controller 135 rewrites an LBA conversion table between LBAs of the pool volumes related to the data movement and the virtual volumes in the LBA conversion table of the thin provisioning controller 132 (S104).

Figure 11:
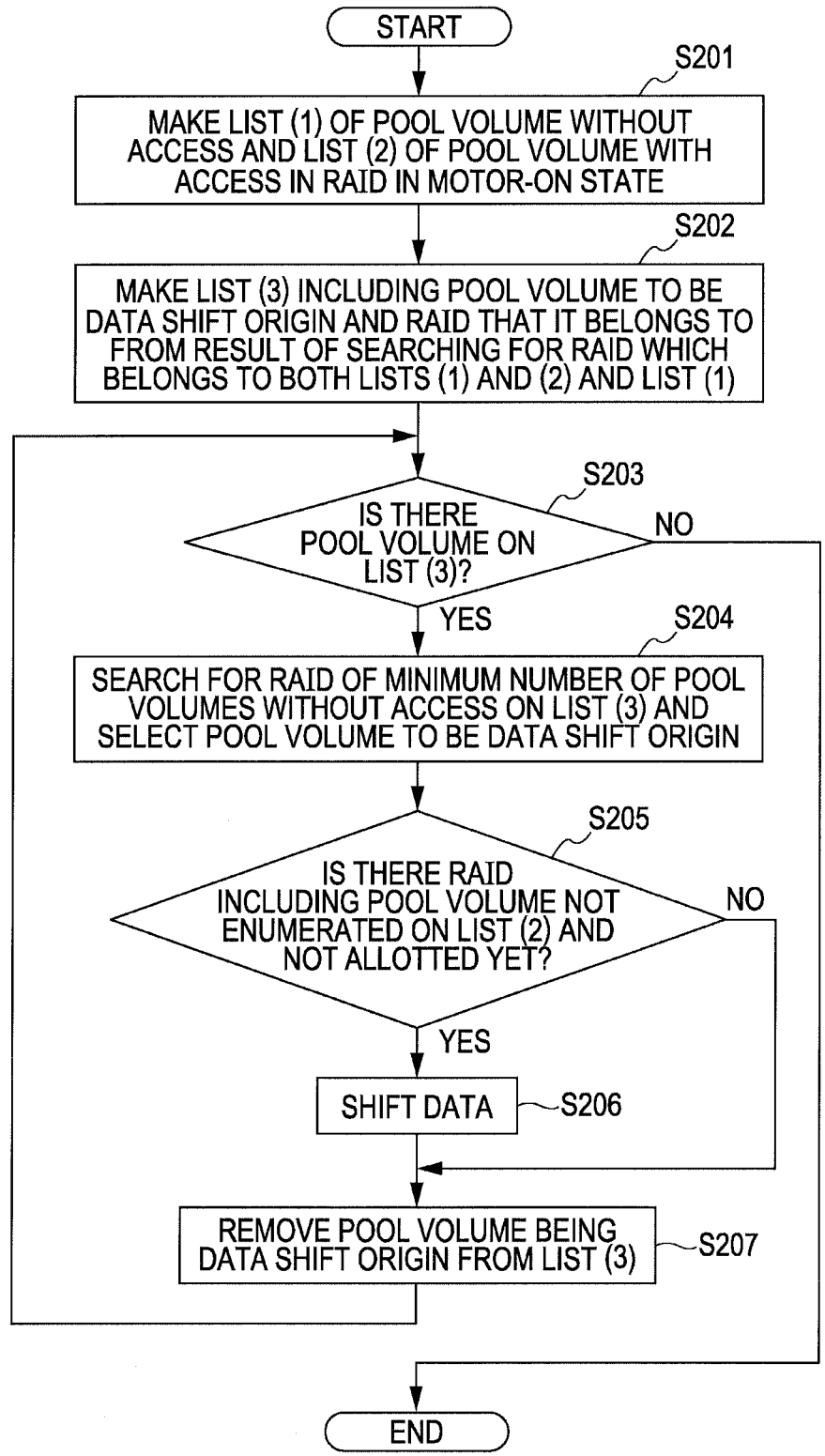
FIG. 11 illustrates a control flow of an exemplary analysis and an exemplary rearrangement carried out by the access analyzing unit and by the rearrangement controller, respectively.
Figure 12:
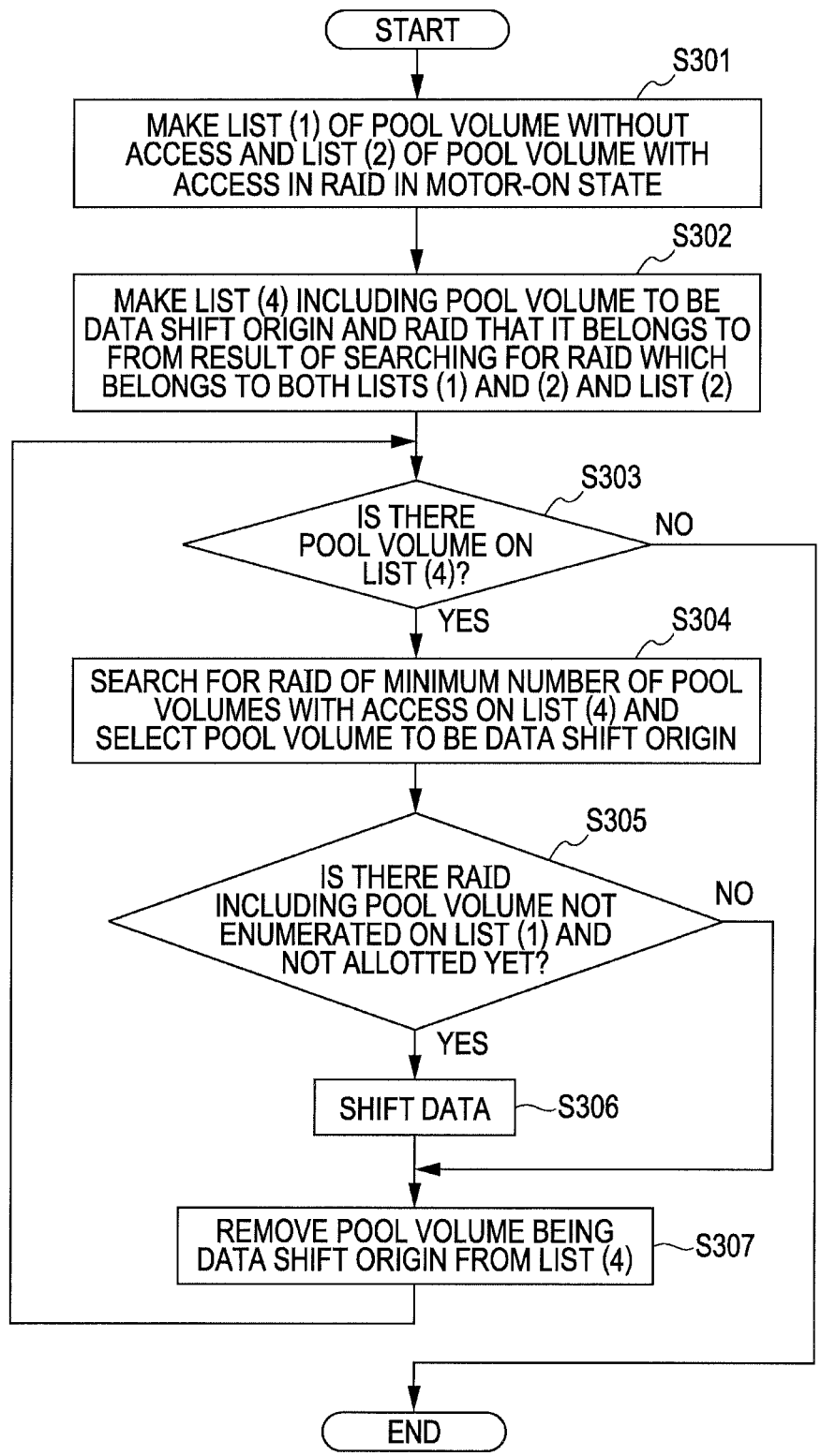
FIG. 12 illustrates a control flow of an exemplary analysis and an exemplary rearrangement carried out by the access analyzing unit and by the rearrangement controller, respectively.

FIGS. 11 and 12 illustrate exemplary control flows of an analysis carried out by the access analyzing unit (S102) and a rearrangement carried out by the rearrangement controller (S103).

FIG. 11 illustrates a control flow for data movement, at a certain point of time and to a RAID group being driven without access for a certain period of time, data in a pool volume without access included in another RAID group accessed in a certain period of time.

The access analyzing unit 134 makes an access management table from pieces of access information (the virtual volume accessed by the server, the pool volume corresponding to the area of the accessed virtual volume, and the latest time when the access is done) obtained from the access monitoring unit 133. Further, the access analyzing unit 134 makes, from the access management table having been made, a list (1) formed by two items which are pool volume not being accessed for a certain period of time and a RAID group that the pool volume belongs to in the RAID groups for which the storage media being driven are recognized. In the access management table 78 illustrated in FIG. 6, e.g., pool volumes not being accessed for a certain period of time and enumerated on the list (1) are Pool Volume #1-1, Pool Volume #1-n, Pool Volume #2-0 and Pool Volume #2-1.

The access analyzing unit 134 obtains information held by the configuration management unit 137 as to conditions in driving the storage media. The access analyzing unit 134 further makes, from the access management table made by the access monitoring unit 133, a list (2) formed by two items which are a pool volume with access and a RAID group that the pool volume belongs to (S201). In the access management table 78 illustrated in FIG. 6, e.g., pool volumes with access enumerated on the list (2) are Pool Volume #0-0, Pool Volume #0-1, Pool Volume #0-n and Pool Volume #1-0.

Then, the access analyzing unit 134 searches for a RAID group which belongs to both the lists (1) and (2). A RAID group searched for includes pool volumes being with and without access for a certain period of time mixed with each other, and turns to be a candidate for a RAID group to be a data shift origin. The access analyzing unit 134 makes, from a result of the search and the list (1), a list (3) formed by two items which are a pool volume to be a data shift origin and a RAID group that the pool volume belongs to (S202). According to the lists (1) and (2) made from the access management table 78 illustrated in FIG. 6, e.g., pool volumes enumerated on the list (3) are Pool Volume #1-1 (RAID group #1) and Pool Volume #1-n (RAID group #1).

When a pool volume is enumerated on the list (3) (S203 Yes-identified), the access analyzing unit 134 searches for a RAID group of the minimum number of pool volumes without access on the list (3), and selects a pool volume which belongs to that RAID group as a pool volume to be a data shift origin (S204). It is preferable to move data in the pool volume selected as such as an amount of moved data is smallest.

Then, the access analyzing unit 134 identifies whether there is a RAID group including a pool volume not enumerated on the list (2) and not allotted to the virtual volumes yet that data stored in the data shift origin may be moved to with reference to the LBA conversion table made by the thin provisioning controller 132 (S205). The pool volume not allotted yet that belongs to the RAID group including a pool volume not enumerated on the list (2) and not allotted yet that data stored in the data shift origin may be moved to turns to be a candidate for a pool volume to be a data shift destination. That is to collect data stored without access for a certain period of time into a particular RAID group.

If there is a RAID group including a pool volume not enumerated on the list (2) and not allotted yet that data stored in the data shift origin may be moved to (S205 Yes-identified), the rearrangement controller 135 copies data in the pool volume of the data shift origin selected at S204 into the pool volume not allotted yet and identified at S205 (data shift destination) (S206). Then, the rearrangement controller 135 removes the pool volume being the data shift origin having completed the data movement and a list of the RAID group that the pool volume to be removed belongs to (S207).

Unless there is a RAID group including a pool volume not enumerated on the list (2) and not allotted yet that data stored in the data shift origin may be moved to (S205 No-identified), the rearrangement controller 135 removes the pool volume selected as the data shift origin at S204 and a list of the RAID group that the pool volume belongs to without carrying out a data movement (S207).

Then, if a pool volume enumerated on the list (3) remains (S203 Yes-identified), the access analyzing unit 134 and the rearrangement controller 135 repeat above S204-207. Unless such a pool volume remains (S203 No-identified), the analysis and rearrangement process ends.

After Yes-identified at S205 in the rearrangement illustrated in FIG. 11, the rearrangement controller 135 may make an LBA conversion table in advance in order to carry out a rearrangement process and to change the allotment of the LBA of the pool volumes to the LBA of the virtual volumes after the rearrangement process. After the rearrangement process is completed, the thin provisioning controller 132 replaces the existing LBA conversion table with the LBA conversion table made by the rearrangement controller 135.

FIG. 12 illustrates a control flow for data movement, at a certain point of time and to a pool volume not allotted yet of a RAID group accessed in a certain period of time, a pool volume of another RAID group accessed in a certain period of time.

The access analyzing unit 134 makes an access management table from pieces of access information (the virtual volume accessed by the server, the pool volume corresponding to the area of the accessed virtual volume, and the latest time when the access is done) obtained from the access monitoring unit 133. Further, the access analyzing unit 134 makes, from the access management table having been made, a list (1) formed by two items which are a pool volume not being accessed for a certain period of time and a RAID group that the pool volume belongs to in the RAID groups for which the storage media being driven are being recognized. The access analyzing unit 134 obtains information held by the configuration management unit 137 as to conditions in driving the storage media. The access analyzing unit 134 further makes, from the access management table made by the access monitoring unit, a list (2) formed by two items which are a pool volume with access and a RAID group that the pool volume belongs to (S301).

Then, the access analyzing unit 134 searches for a RAID group which belongs to both the lists (1) and (2). A RAID group searched for includes pool volumes being with and without access for a certain period of time mixed with each other, and turns to be a candidate for a RAID group to be a data shift origin. The access analyzing unit 134 makes, from a result of the search and the list (2), a list (4) formed by two items which are a pool volume to be a data shift origin and a RAID group that the pool volume belongs to (S302). According to the lists (1) and (2) made from the access management table 78 illustrated in FIG. 6, e.g., a pool volume enumerated on the list (4) is Pool Volume #1-0 (RAID group #1).

When a pool volume is enumerated on the list (4) (S303 Yes-identified), the access analyzing unit 134 searches for a RAID group of the minimum number of pool volumes with access, and selects a pool volume which belongs to that RAID group as the pool volume to be a data shift origin (S304). It is because an amount of moved data is smallest if data in the selected pool volume is shifted.

The access analyzing unit 134 identifies whether there is a RAID group including a pool volume enumerated on the list (4) and not allotted yet that data stored in the data shift origin may be shifted to with reference to the LBA conversion table made by the thin provisioning controller 132 (S305).

The pool volume not allotted yet that belongs to the RAID group including a pool volume enumerated on the list (4) and not allotted yet that data stored in the data shift origin may be shifted to with reference to the LBA conversion table made by the thin provisioning controller 132 turns to be a candidate for a pool volume to be a data shift destination that data in the accessed data shift origin is copied into. That is to collect data accessed in a certain period of time into a particular RAID group.

If there is a RAID group including a pool volume enumerated on the list (4) and not allotted yet that data stored in the data shift origin may be shifted to with reference to the LBA conversion table made by the thin provisioning controller 132 (S305 Yes-identified), the rearrangement controller 135 copies data in the pool volume of the data shift origin selected at S304 into the pool volume not allotted yet and identified at S305 (data shift destination) (S306). Then, the rearrangement controller 135 removes pool volume being the data shift origin having completed the data shift and a list of the RAID group that the pool volume to be removed belongs to (S307).

Unless there is a RAID group including a pool volume enumerated on the list (4) and not allotted yet that data stored in the data shift origin may be shifted to with reference to the LBA conversion table made by the thin provisioning controller 132 (S305 No-identified), the rearrangement controller 135 removes the pool volume selected as the data shift origin at S304 and a list of the RAID group that the pool volume belongs to without carrying out a data shift (S307).

Then, if a pool volume enumerated on the list (4) remains (S303 Yes-identified), the access analyzing unit 134 and the rearrangement controller 135 repeat above S304-307. Unless such a pool volume remains (S303 No-identified), the analysis and rearrangement process ends.

After Yes-identified at S204 in the rearrangement illustrated in FIG. 12, the rearrangement controller 135 may make an LBA conversion table in advance in order to carry out the rearrangement process and to change the allotment of the LBA of the pool volumes to the LBA of the virtual volumes after the rearrangement process. After the rearrangement process is completed, the thin provisioning controller 132 replaces the existing LBA conversion table with the LBA conversion table made by the rearrangement controller 135.

According to the storage control apparatus and the storage control method of the storage system of the first embodiment, access to a plurality of pool volumes set across a plurality of storage devices which forms a RAID group is monitored and analyzed, data in pool volumes of similar access frequencies is shifted to one of a plurality of RAID groups, and an LBA conversion table is rewritten as the data is shifted. Thus, a plurality of storage devices which forms a RAID group having a pool volume of high access frequency may be driven, and a plurality of storage devices which forms a RAID group having a pool volume of low access frequency may be stopped. The storage devices group may thereby suppress its power consumption. If an amount of pool volumes allotted to virtual volumes increases in thin provisioning, according to the storage control apparatus and the storage control method of the first embodiment, the number of storage devices being in a motor on state decreases with respect to an amount of data frequently accessed, so that the storage devices group may effectively suppress its power consumption. Further, as data is shifted among the RAID groups on a pool volume by pool volume basis, a server need not be provided with a special function for a data shift. Further, as the LBA conversion table is rewritten as data is shifted, the data shift does not affect the virtual volume being recognized on the server side.

Incidentally, the storage device 17 of the first embodiment may be a solid state disk (SSD) instead of the HDD. In that case, e.g., the disk motor controller 136 stops the SSD not accessed for a certain period of time from being supplied with power.

A second embodiment of the analysis method using the access analyzing unit and the rearrangement method using the rearrangement controller will be explained below by the use of FIGS. 13-17. Each of portions of the storage system of the second embodiment common to that of the first embodiment is given a same reference numeral, and its explanation is omitted.

The access analyzing unit of the second embodiment makes an access flag map and selects a pool volume to be a data shift origin by using the access flag map.

Figure 13:
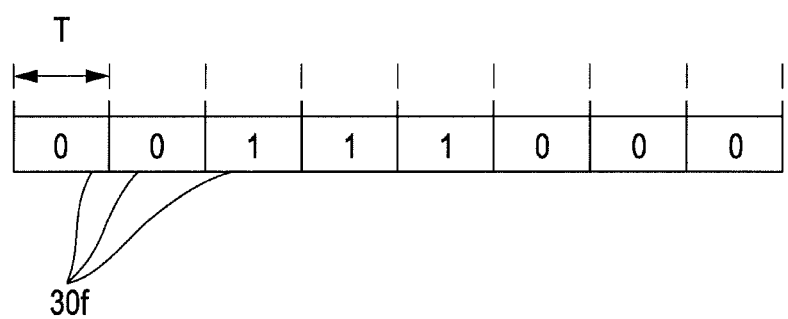
FIG. 13 illustrates an access flag map made by the access analyzing unit on the basis of data monitored by an access monitoring unit.

FIG. 13 illustrates an access flag map of a pool volume made by the access analyzing unit 134 on the basis of pieces of information monitored by the access monitoring unit 133. FIG. 13 indicates time in the horizontal direction, and an access flag 30f is registered every fixed period of time T. A flag value of the access flag 30f is set to 1 and 0 upon the pool volume being accessed and not accessed by the server in the fixed period of time T, respectively. The fixed period of time T may be set to any length, e.g., to five minutes, one hour, 24 hours or one week.

Figure 14A:
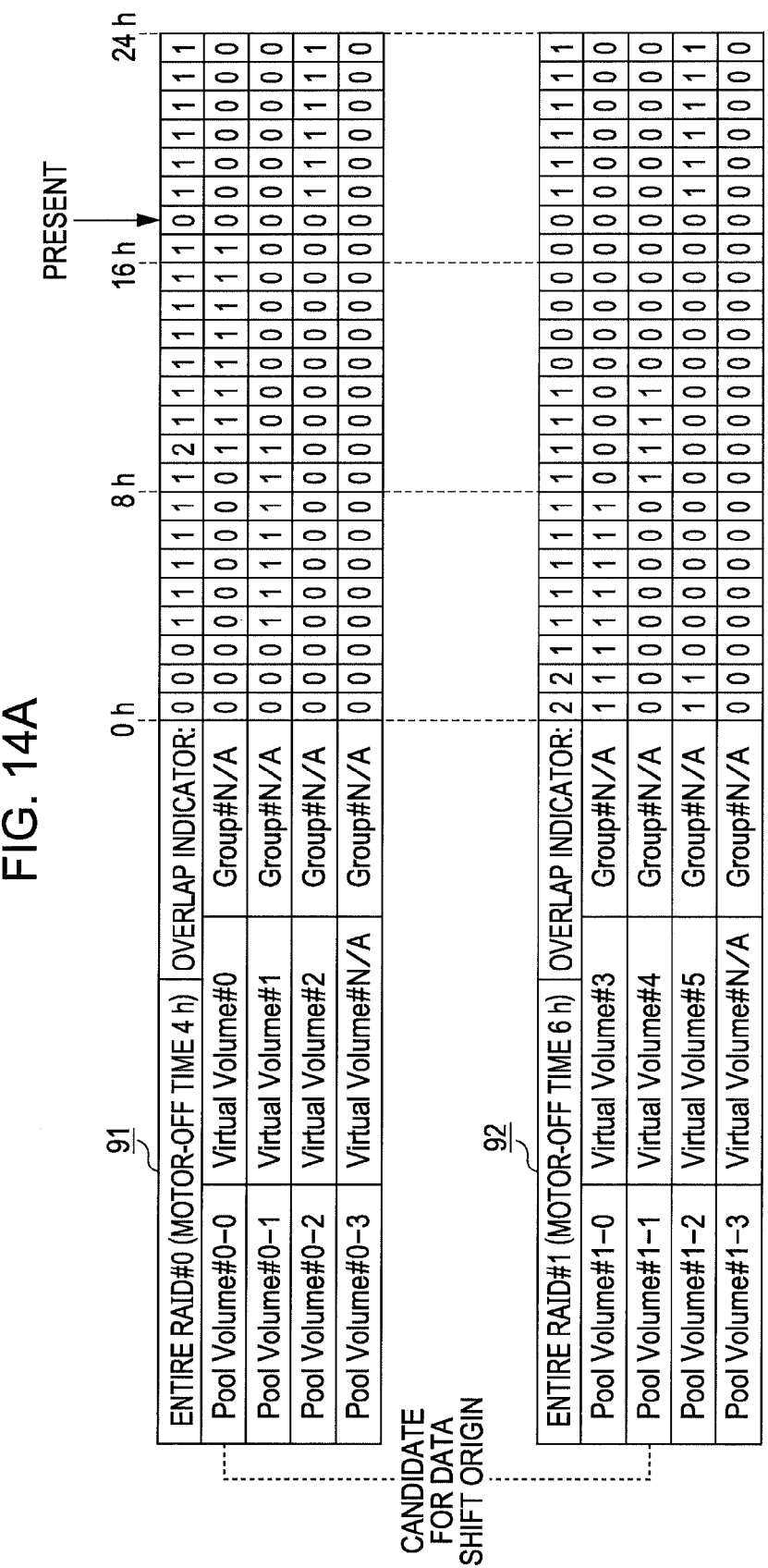
FIGS. 14A and 14B illustrate access flag maps indicating progress of an analysis carried out by the access analyzing unit.

FIG. 14A illustrates exemplary access flag maps 91 and 92 which represent whether the pool volumes in the RAID groups #0 and #1 each are accessed. Whether the pool volumes each were accessed or not every hour since 23 hours ago up to present (at 17) is written in the access flag maps 91 and 92. The values 1 and 0 are written in case of access and no access, respectively. Items on the left hand side of each of the access flag maps are a pool volume, a virtual volume that it's allotted to and grouping in left to right order. Symbols #N/A represent not allotted yet in the virtual volume and grouping items.

Further, an overlap indicator is written for every RAID group on the access flag maps 91 and 92. The overlap indicator is a sum of the flags of all the pool volumes belonging to each of the RAID groups. A period of time of a high overlap indicator suggests a high frequency of access to the storage devices which form the RAID.

The access analyzing unit 134 selects pool volumes belonging to different RAID groups and having similar access characteristics from the access flag maps 91 and 92. The pool volumes having similar access characteristics are, e.g., pool volumes belonging to RAID groups different from each other, both of them being accessed in a certain period of time. Further, the pool volumes having similar access characteristics are, e.g., pool volumes belonging to RAID groups different from each other, neither of them being accessed in a certain period of time. The access analyzing unit 134 selects a pool volume to be the data shift origin so that driving time of the storage device may be shorter than the present value on the assumption that the pool volumes belong to one and the same RAID group.

In the access flag maps 91 and 92 illustrated in FIG. 14A, the pool volumes #0-0 and #1-1 are accessed for three hours, 9 through 11. The access analyzing unit 134 selects the pool volumes #0-0 and #1-1 on the access flag maps 91 and 92, respectively, as candidates for data shift origins.

Then, shift entire data included in one of the two pool volumes being the candidates for the data shift origin to a pool volume not allotted yet included in another RAID group that the one of the candidate pool volumes does not belong to. The access analyzing unit 134 selects which of the candidate pool volumes is made the data shift origin. Compare a case on the assumption that the pool volume belonging to the one RAID group is made the data shift origin with a case on the assumption that the pool volume belonging to the other RAID group is made the data shift origin, and select the pool volume in the case of more suppressed power consumption as the pool volume of the data shift origin.

On the assumption that entire data in the pool volume #0-0 is shifted to a pool volume not allotted yet in the RAID group #1, motor-off hours of the RAID group #0 increase by seven hours from four hours to eleven hours. Meanwhile, motor-off hours of the RAID group #1 decrease by five hours from four hours to one hour. Further, on the assumption that entire data in the pool volume #1-1 is shifted to a pool volume not allotted yet in the RAID group #0, the motor-off hours of the RAID group #0 remain four hours. Meanwhile, the motor-off hours of the RAID group #1 increase by four hours from six hours to ten hours. If power consumption of the storage devices forming the RAID group #0 is same as that of the storage devices forming the RAID group #1, it is more effective for suppressing power consumption to shift data in the pool volume #1-1 belonging to the RAID group #1 to data in the pool volume not allotted yet in the RAID group #0.

Figure 14B:
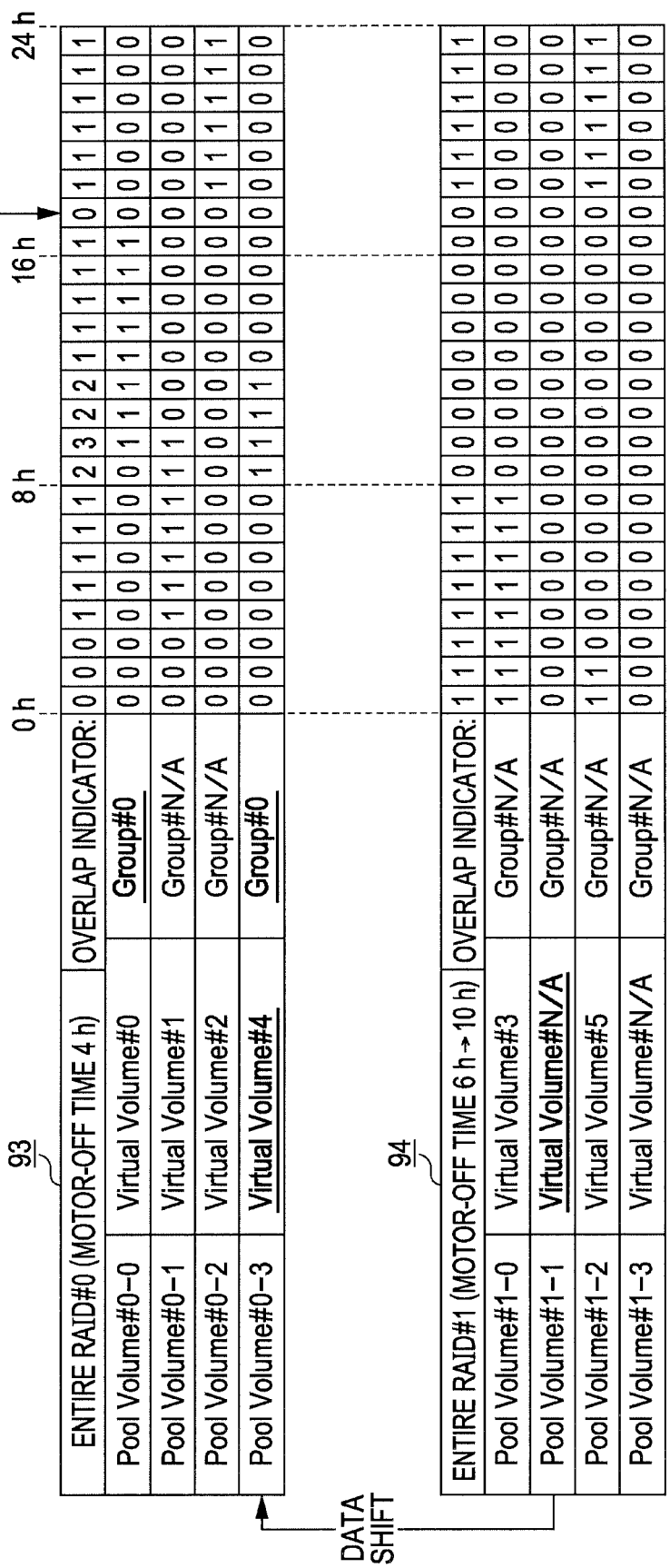

Upon the data shift origin being selected, the access controller 134 identifies whether there is a pool volume not allotted yet in the RAID group being the data shift destination. If there is a pool volume not allotted yet, as illustrated in FIG. 14B, the rearrangement controller 135 shifts the data in the pool volume #1-1 on the access flag map 94 to the pool volume #0-3 not allotted yet in the RAID group #0 on the access flag map 93. Then, as illustrated on the access flag map 93, the grouping items of the pool volumes #0-0 and #0-3 are given a value of group #0 and are grouped. Why those pool volumes are grouped is that they are similar to each other in the access frequency, the periods of time when accessed, etc. Previously grouped pool volumes are supposed not to be selected again as candidates for data shift origins as a rule. That is to avoid, in one processing cycle to select a pool volume of the data shift destination and to shift data, a useless process such as to shift data having been shifted to the data shift destination again. If the access characteristic changes as time passes, however, it may turn meaningless to keep the pool volumes being grouped. In such a case, the pool volumes may be released from being grouped, and a formation in grouping the pool volumes may be rebuilt.

Further, as the access flag maps 93 and 94 illustrate in FIG. 14B, the pool volumes #0-2 and #1-2 are accessed for six hours, 18 through 24. As the access flag maps 95 and 96 illustrate in FIG. 15A, the access analyzing unit 134 selects the pool volumes #0-2 and #1-2 as candidates for data shift origins.

Then, shift entire data included in one of the two pool volumes being the candidates for the data shift origin to a pool volume not allotted yet included in another RAID group that the one of the candidate pool volumes does not belong to. The access analyzing unit 134 identifies which of the candidate pool volumes is made the data shift origin. On the assumption that entire data in the pool volume #0-2 is shifted to a pool volume not allotted yet in the RAID group #1, motor-off hours of the RAID group #0 increase by six hours from four hours to ten hours. Meanwhile, motor-off hours of the RAID group #1 remain ten hours. Further, on the assumption that entire data in the pool volume #1-2 is shifted from the RAID group #1 to a pool volume not illustrated and not allotted yet in the RAID group #0, motor-off hours of the RAID group #0 decrease by two hours from four hours to two hours. Meanwhile, motor-off hours of the RAID group #1 increase by six hours from ten hours to 16 hours. If power consumption of the storage devices forming the RAID group #0 is same as that of the storage devices forming the RAID group #1, it is more effective for suppressing power consumption to shift the pool volume #0-2 belonging to the RAID group #0 to the pool volume not allotted yet in the RAID group #1.

Figure 15A:
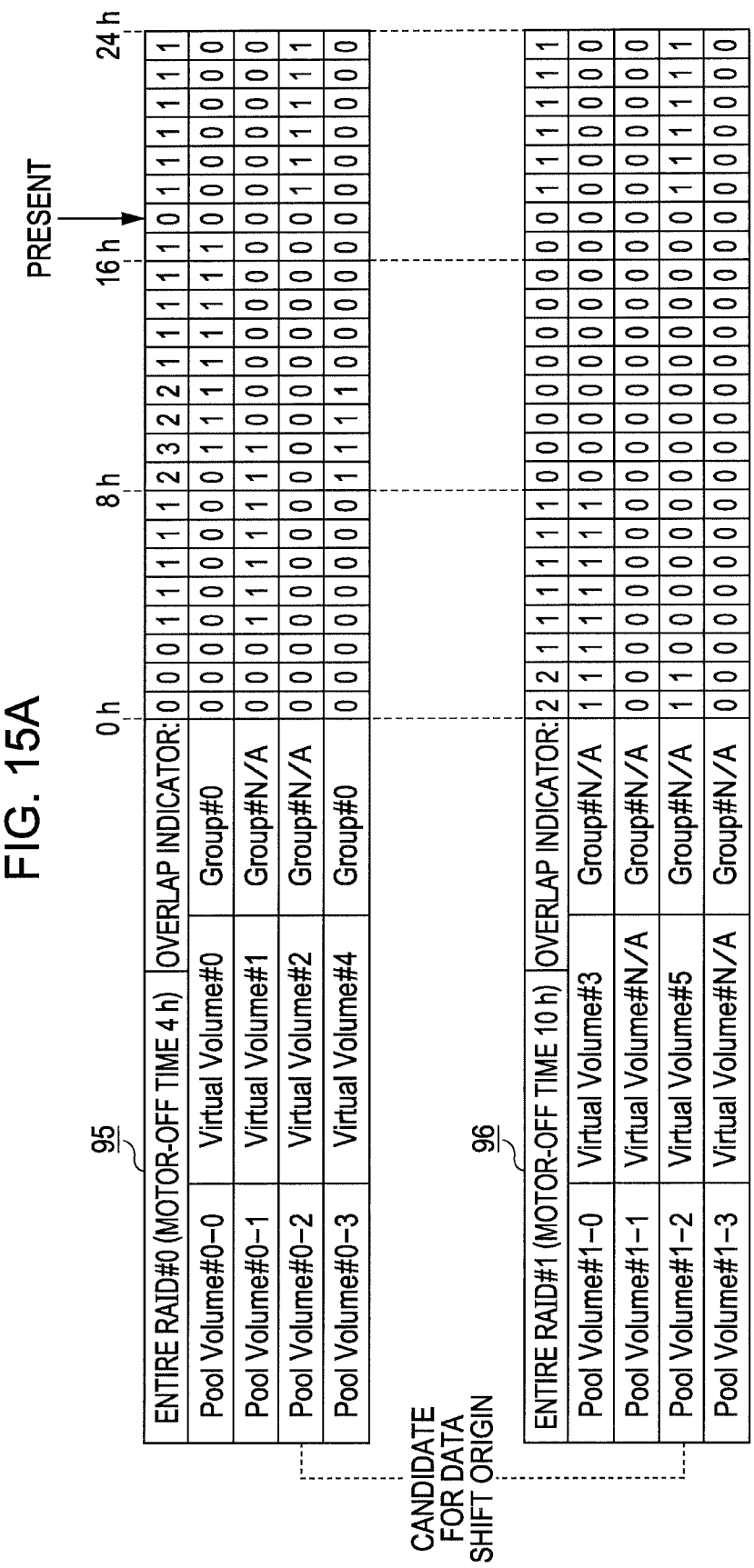
FIGS. 15A and 15B illustrate access flag maps indicating progress of an analysis carried out by the access analyzing unit.
Figure 15B:
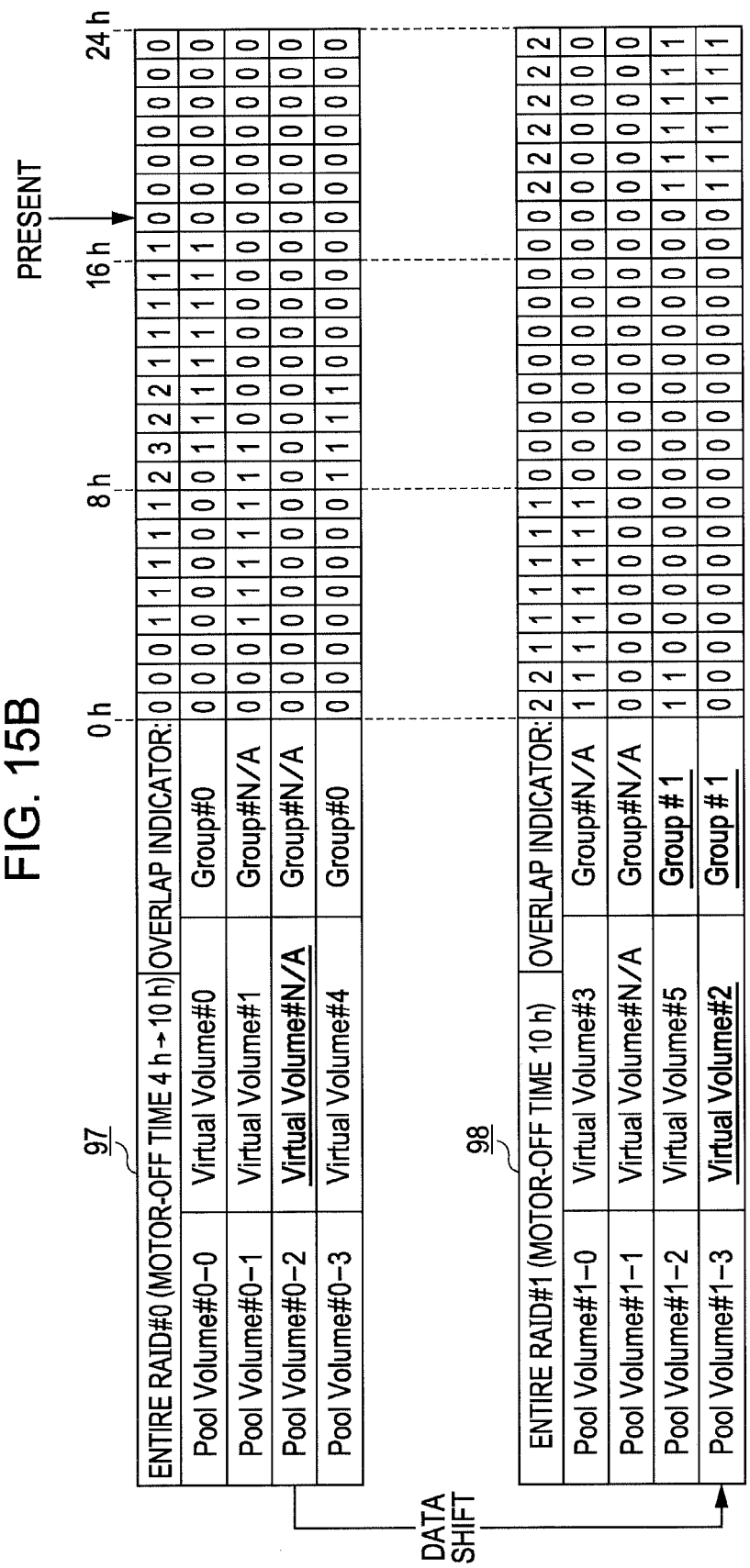

As illustrated FIG. 15B, the rearrangement controller 135 shifts the pool volume #0-2 on an access flag map 97 to the pool volume #1-3 not allotted yet in the RAID group #1 on an access flag map 98. Then, the grouping items of the pool volumes #1-2 and #1-3 are given a value of group #1 and are grouped.

Figure 16:
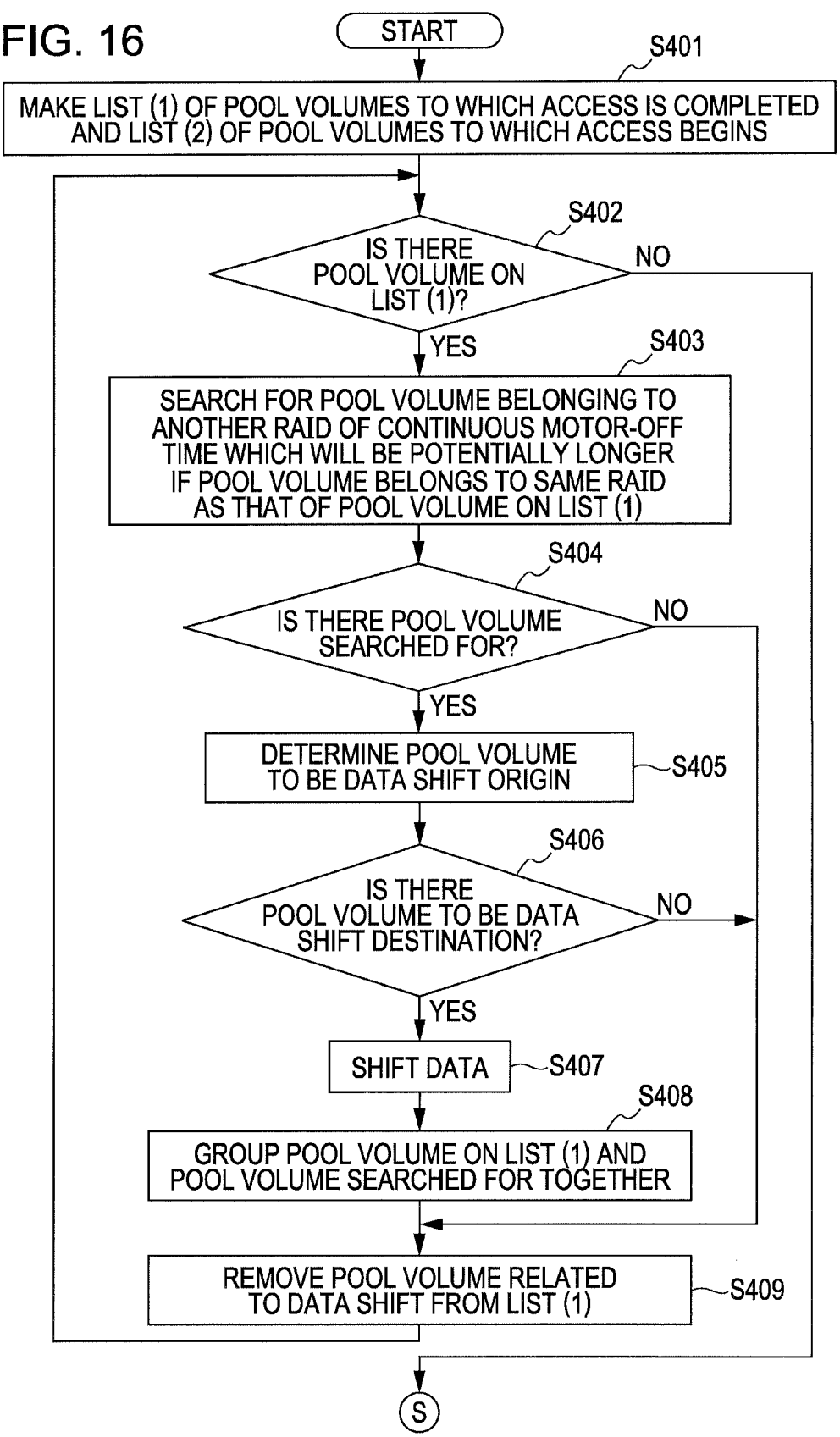
FIG. 16 illustrates an exemplary flowchart of an analysis carried out by the use of an access flag map made by the access analyzing unit as to a second embodiment.
Figure 17:
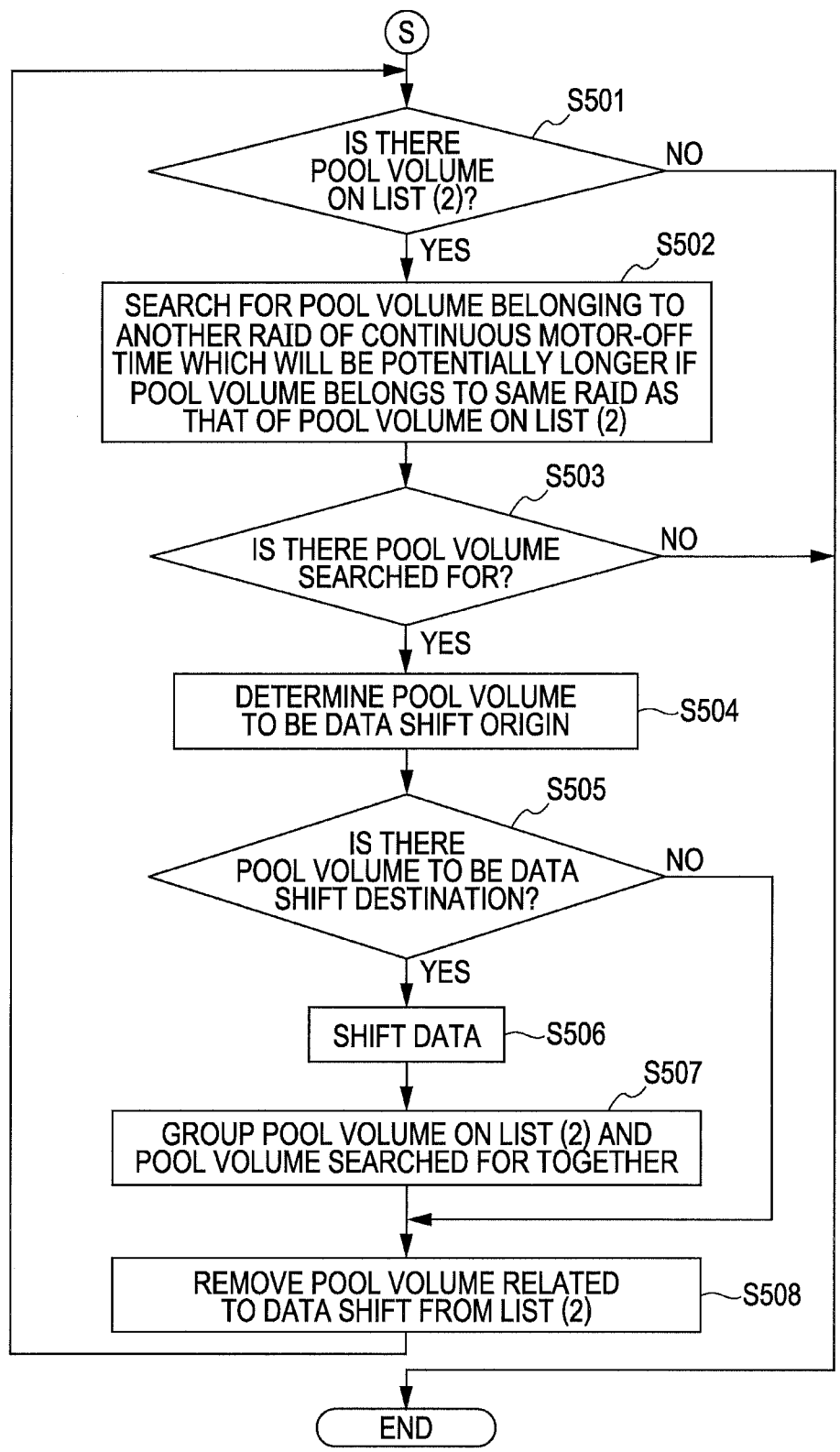
FIG. 17 illustrates an exemplary flowchart of an analysis carried out by the use of an access flag map made by the access analyzing unit as to the second embodiment.

FIGS. 16-17 illustrate flowcharts of an analysis carried out by the use of the access flag map made by the access analyzing unit and a rearrangement based on a result of the analysis as to the second embodiment.

To begin with, the access analyzing unit 134 makes a list (1) of pool volumes to which access is completed and a list (2) of pool volumes to which access begins at present (at 17) (S401). According to the access flag map illustrated in FIG. 14A, the pool volume #0-0 is enumerated on the list (1), and the pool volumes #0-2 and #1-2 are enumerated on the list (2). The pool volumes enumerated on the lists (1) and (2) made in this process turn to be pool volumes of candidates for a data shift origin. Methods for selecting a combination of candidates for data shift origins are not limited to the above, though.

Then, the access analyzing unit 134 identifies whether there is a pool volume on the list (1) (S402). If there is a pool volume on the list (1) (S402 Yes-identified), the access analyzing unit 134 searches for a pool volume belonging to another RAID of continuous motor-off time that will be potentially longer if the pool volume belongs to the same RAID group as that of the pool volume on the list (1) (S403). Specifically, calculate a logical sum (OR) of the access flag of the pool volume on the list (1) and an access flag of another pool volume. As a result of the logical sum operation, a pool volume of a longest continuous period of time for which values of both of them are 0 is obtained as a result of the search.

If there is a pool volume searched for as a result of S403 (S404 Yes-identified), the access analyzing unit 134 determines a pool volume to be a data shift origin (S405). One of the pool volumes on the list (1) searched for at S403 and the pool volume resulted in by the search are candidate pool volumes for the data shift origin explained by the use of FIG. 14A. The access analyzing unit 134 identifies in the current process which of the candidate pool volumes for the data shift origin is made the data shift origin.

Then, the access analyzing unit 134 identifies whether there is a pool volume to be a data shift destination. If there is a pool volume to be a data shift destination (S406 Yes-identified), the rearrangement controller 135 shifts (copies) entire data in the pool volume being the data shift origin to the pool volume being the data shift destination (S407). Then, the access analyzing unit 134 groups the pool volume on the list (1) and the pool volume of the result of the search together (S408). Further, the access analyzing unit 134 removes the pool volume related to the data shift from the list (1) (S409). For the exemplary analysis using the access flag map explained by the use of FIGS. 14A and 14B, the pool volumes #0-2 and #1-2 are removed.

If there is no pool volume searched for as a result of S403 (S404 No-identified), or if there is no pool volume to be a data shift destination at S406 (S406 No-identified), the access analyzing unit 134 removes the pool volume related to the data shift from the list (1) (S409).

If a pool volume remains on the list (1) after S409 (S402 Yes-identified), repeat S403-S409. If no pool volume remains on the list (1) (S402 No-identified), examine a data shift as to the pool volumes on the list (2) (to S501).

The access analyzing unit 134 identifies whether there is a pool volume on the list (2) (S501). If there is a pool volume on the list (2) (S501 Yes-identified), the access analyzing unit 134 searches, similarly as S403, for a pool volume belonging to another RAID of continuous motor-off time that will be potentially longer if the pool volume belongs to the same RAID group as that of the pool volume on the list (2) (S502).

If there is a pool volume searched for as a result of S502 (S503 Yes-identified), the access analyzing unit 134 determines a pool volume to be a data shift origin (S504). One of the pool volumes on the list (2) searched for at S502 and the pool volume resulted in by the search are candidate pool volumes for the data shift origin explained by the use of FIG. 15A. The access analyzing unit 134 identifies which of the pool volumes is made the data shift origin.

Then, the access analyzing unit 134 identifies whether there is a pool volume to be a data shift destination. If there is a pool volume to be a data shift destination (S505 Yes-identified), the rearrangement controller 135 shift (copies) entire data in the pool volume being the data shift origin to the pool volume being the data shift destination (S506). Then, the access analyzing unit 134 groups the pool volume on the list (2) and the pool volume of the result of the search together (S507). Further, the access analyzing unit 134 removes the pool volume related to the data shift from the list (2) (S508). For the exemplary analysis made by the use of the access flag maps explained with reference to FIGS. 14A-15B, the pool volumes #0-2 and #1-2 are removed.

If there is no pool volume searched for as a result of S502 (S503 No-identified), or if there is no pool volume to be a data shift destination at S505 (S505 No-identified), the access analyzing unit 134 removes the pool volume related to the data shift from the list (2) (S508).

If a pool volume remains on the list (2) after S508 (S501 Yes-identified), repeat S502-508. If no pool volume remains on the list (2) (S501 No-identified), the access analysis and rearrangement end.

Incidentally, according to the above embodiment, the access flag maps are made in order that data is shifted on the basis of the access characteristics in the past. The server unexpectedly accesses a pool volume in some cases, though. In that case, e.g., the I/O controller sends a busy flag back to the server, or waits for the disk of the storage device to rotate and be accessible and then accesses a storage area of the storage device.

Further, when the server accesses a pool volume being the data shift origin to read data while data is being shifted (copied), the server reads data recorded in the storage area, e.g., by means of the I/O controller which directly accesses the pool volume before the data shift. Further, when the server accesses a pool volume being the data shift origin to write data while data is being shifted (copied), the server writes data into the storage area as follows. The I/O controller, e.g., temporarily reserves data to be written to a memory 2, and writes the temporarily reserved data into the data shift destination after the data shift finishes.

According to the storage control method using the analysis method of the second embodiment, similarly as the storage control method of the first embodiment, the storage device may suppress its power consumption. If a quantity of pool volumes allotted to virtual volumes increases in thin provisioning, the storage devices group may effectively suppress its power consumption. Further, the servers need not be provided with a special function for shifting data. Further, the data shift does not affect the volume being recognized on the server side. Further, according to the second embodiment, whether the pool volumes are accessed or not is monitored every hour so that data may be shifted more precisely for suppression of power consumption. The power consumption may thereby be further suppressed.

A third embodiment of the analysis method using the access analyzing unit and the rearrangement method using the rearrangement controller will be explained below by the use of FIGS. 18-21. Each of portions of the storage system of the third embodiment common to that of the second embodiment is given a same reference numeral, and its explanation is omitted.

The third embodiment employs analysis and rearrangement methods which are same as those of the second embodiment except for a difference in the method for selecting a pool volume to be a data shift origin (S405 and S505) in the analysis method using the access analyzing unit of the second embodiment. A method for selecting a pool volume to be a data shift origin will be explained below.

Figure 18:
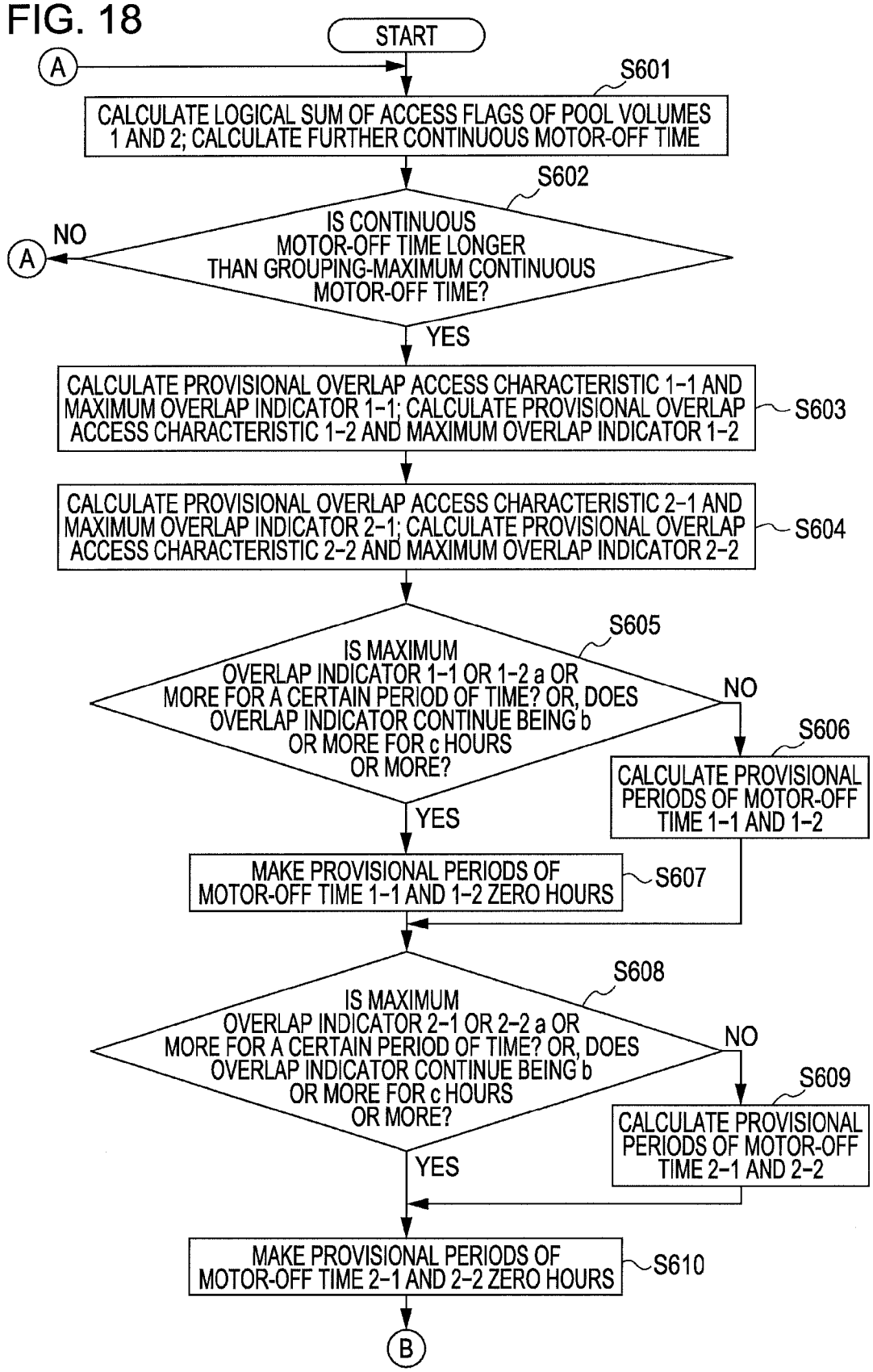
FIG. 18 illustrates an exemplary flowchart of an analysis carried out by the use of an access flag map made by the access analyzing unit as to a third embodiment.
Figure 19:
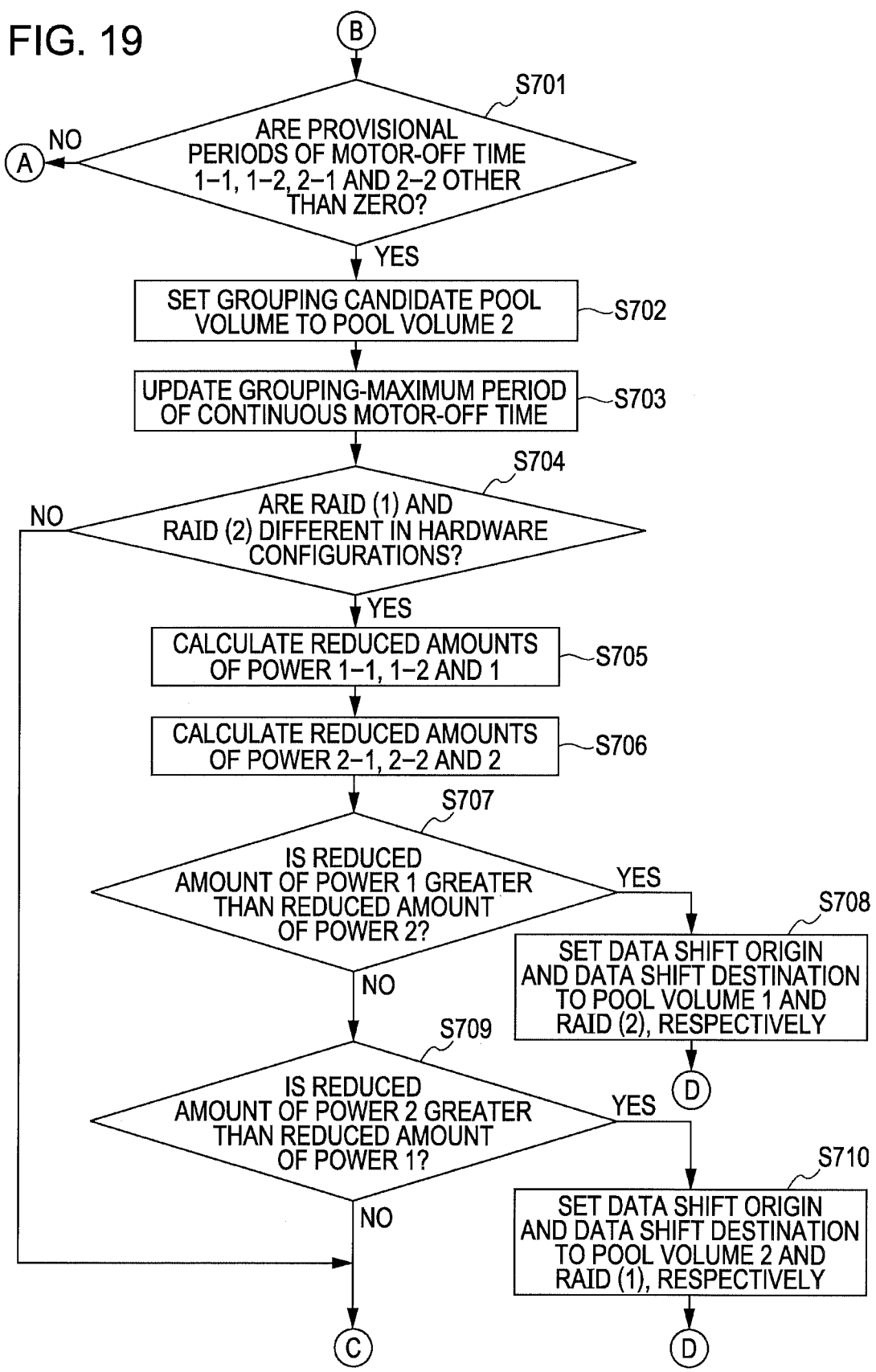
FIG. 19 illustrates an exemplary flowchart of an analysis carried out by the use of an access flag map made by the access analyzing unit as to the third embodiment.
Figure 20:
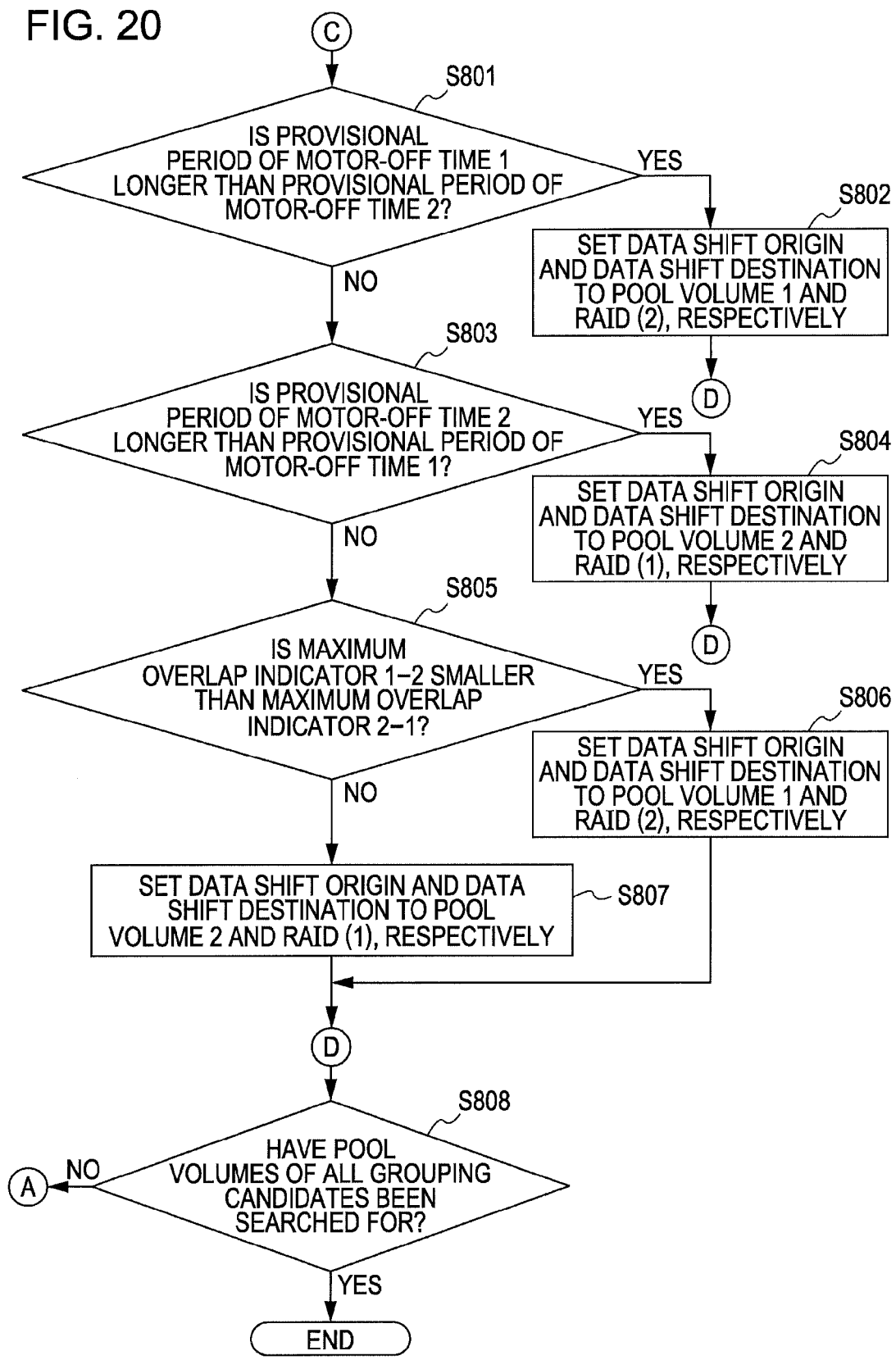
FIG. 20 illustrates an exemplary flowchart of an analysis carried out by the use of an access flag map made by the access analyzing unit as to the third embodiment.

FIGS. 18-20 illustrate an exemplary flowchart of an analysis carried out by the use of an access flag map made by the access analyzing unit and a rearrangement based on a result of the analysis as to the third embodiment.

As to the third embodiment, the pool volumes enumerated on the lists (1) and (2) of the second embodiment each are generically called a "pool volume 1", and the RAID groups to which the pool volumes on the lists (1) and (2) belong each are generically called a "RAID (1)". Further, RAID groups excluding the "RAID (1)" each are generically called a "RAID (2)", and pool volumes belonging to the "RAID (2)" each are generically called a "pool volume 2".

In the analysis of the access flag map illustrated in FIG. 14A, the pool volume #0-0 is enumerated on the list (1), and the pool volumes #0-2 and #1-2 are enumerated on the list (2), and they each are generically called a pool volume 1.

If the RAID group #0 that the pool volume #0-0 belongs to is a RAID (1), e.g., a RAID (2) corresponding to this RAID (1) is a RAID group excluding the RAID group #0, i.e., the RAID group #1. Further, the pool volumes belonging to the RAID group #1 each are a pool volume 2.

Further, if the RAID group #1 that the pool volume #1-2 belongs to is a RAID (1), e.g., a RAID (2) corresponding to this RAID (1) is a RAID group excluding the RAID group #1, i.e., the RAID group #0. Further, the pool volumes belonging to the RAID group #0 each are a pool volume 2.

To begin with, the access analyzing unit 134 calculates a logical sum of an access flag value of one pool volume 1 selected from the pool volume group enumerated on the list (1) or (2) and an access flag value of one pool volume 2 selected from the respective pool groups belonging to the RAID groups excluding the RAID (1) in respective periods of time. The calculated logical sum is called a provisional grouping access characteristic. The access analyzing unit 134 further calculates a maximum value of a period of time for which the motor may be continuously kept off (i.e., neither the pool volumes 1 nor 2 is continuously kept without access) from the provisional grouping access characteristic on the assumption that the pool volumes 1 and 2 belong to one and the same RAID (S601).

Then, the access analyzing unit 134 identifies whether the maximum value of the period of continuous motor-off time calculated at S601 is longer than a grouping-maximum period of continuous motor-off time (S602).

The grouping-maximum period of continuous motor-off time means the maximum of maximum periods of continuous motor-off time having already been calculated among the pool volumes 1 and the respective pool volumes 2. The initial value of the grouping-maximum period of continuous motor-off time is 0.

Unless the maximum period of continuous motor-off time is longer (S602 No-identified), a provisional grouping access characteristic between the pool volume 1 and another pool volume 2 is repeatedly calculated (S601-602).

If the maximum period of continuous motor-off time is longer (S602 Yes-identified), the access analyzing unit 134 calculates how the access flags of the RAID (1) and the RAID (2) each change on the assumption that the pool volume 1 is shifted to the RAID (2). That is, the access analyzing unit 134 calculates an overlap indicator of the RAID (1) excluding the access flag of the pool volume 1 as a provisional overlap access characteristic 1-1, and let a maximum value of the overlap indicator be a maximum overlap indicator 1-1. Further, the access analyzing unit 134 calculates an overlap indicator of the RAID (2) that the access flag of the pool volume 1 is added to as a provisional overlap access characteristic 1-2, and let a maximum value of the overlap indicator be a maximum overlap indicator 1-2 (S603).

FIG. 21A illustrates the overlap indicators (provisional overlap access characteristics) of the RAID group #0 and the RAID group #1 on the assumption that the pool volume #0-0 is shifted to the RAID group #1 in the analysis of the access flag map illustrated in FIG. 14A. The maximum overlap indicator 1-1 is 2, a value in a period of time 5-8. The maximum overlap indicator 1-2 is 2, a value in periods of time 1-2 and 9-11.

Then, the access analyzing unit 134 calculates how the access flags of the RAID (1) and the RAID (2) each change on the assumption that the pool volume 2 is shifted to the RAID (1). That is, the access analyzing unit 134 calculates an overlap indicator of the RAID (1) that the access flag of the pool volume 2 is added to as a provisional overlap access characteristic 2-1, and let a maximum value of the overlap indicator be a maximum overlap indicator 2-1. Further, the access analyzing unit 134 calculates an overlap indicator of the RAID (2) excluding the access flag of the pool volume 2 as a provisional overlap access characteristic 2-2, and let a maximum value of the overlap indicator be a maximum overlap indicator 2-2 (S604).

FIG. 21B illustrates overlap indicators (provisional overlap access characteristics) of the RAID group #0 and the RAID group #1 on the assumption that the pool volume #1-1 is shifted to the RAID group #0 in the analysis of the access flag map illustrated in FIG. 14A. The maximum overlap indicator 2-1 is 4, a value at 9. The maximum overlap indicator 2-2 is 1, a value in periods of 1-8 and 18-24.

Then, the access analyzing unit 134 identifies (A) whether the maximum overlap indicator 1-1 or 1-2 is equal to or more than a threshold a for a certain period of time, or (B) whether the provisional overlap access characteristic 1-1 or 1-2 continues being equal to or more than a threshold b for a certain period of time equal to or more than a threshold c hours (S605), where the thresholds satisfy an inequality a>b. The threshold a of the maximum overlap indicator, the threshold b of the provisional overlap access characteristic and the threshold of time c are suitably set in accordance with the configuration of the RAID apparatus, setting of the pool volumes, how the storage system is used, etc.

If neither (A) nor (B) is satisfied at S605 (S605 No-identified), the access analyzing unit 134 calculates, from the provisional overlap access characteristic 1-1, a period of motor-off time as a provisional period of motor-off time 1-1, and calculates, from the provisional overlap access characteristic 1-2, a period of motor-off time as a provisional period of motor-off time 1-2 (S606).

If (A) or (B) is satisfied at S605 (S605 Yes-identified), the access analyzing unit 134 makes the provisional periods of motor-off time 1-1 and 1-2 zero hours (ineffective) (S607).

Then, the access analyzing unit 134 identifies (A) whether the maximum overlap indicator 2-1 or 2-2 is equal to or more than the threshold a for a certain period of time, or (B) whether the provisional overlap access characteristic 2-1 or 2-2 continues being equal to or more than the threshold b for a certain period of time equal to or more than the threshold c hours (S608), where a>b.

If neither (A) nor (B) is satisfied at S608 (S608 No-identified), the access analyzing unit 134 calculates, from the provisional overlap access characteristic 2-1, a period of motor-off time as a provisional period of motor-off time 2-1, and calculates, from the provisional overlap access characteristic 2-2, a period of motor-off time as a provisional period of motor-off time 2-2 (S609).

If (A) or (B) is satisfied at S608 (S608 Yes-identified), the access analyzing unit 134 makes the provisional periods of motor-off time 2-1 and 2-2 zero hours (ineffective) (S610).

Then, the access analyzing unit 134 identifies whether the provisional periods of motor-off time 1-1, 1-2, 2-1 and 2-2 are other than zero (S701). If all the provisional periods of motor-off time are zero (S701 No-identified), return to S601.

If at least one of the provisional periods of motor-off time is other than zero (S701 Yes-identified), the access analyzing unit 134 sets a value of a pool volume to be a candidate for the data shift origin together with the pool volume 1, "grouping candidate pool volume", to the pool volume 2 (S702).

Then, the access analyzing unit 134 updates the grouping-maximum period of continuous motor-off time to the maximum value of the period of continuous motor-off time calculated at S601 (S703).

Then, the access analyzing unit 134 identifies whether the RAID (1) and the RAID (2) are different from each other in their hardware configurations (S704). The hardware configurations to be compared with each other relate to power consumption of a single disk included in the storage devices forming the RAID, the number of disks included in the storage devices, etc.

If they are different in the hardware configurations (S704 Yes), the access analyzing unit 134 calculates an amount of power consumed on the assumption that the disk is in a motor-on state only for the provisional period of motor-off time (reduced amount of power) (S705, S706).

That is, the access analyzing unit 134 calculates a reduced amount of power 1-1, e.g., from a product of the provisional period of motor-off time 1-1, the number of disks forming the RAID (1) and an amount of power consumption of a single disk. Further, the access analyzing unit 134 calculates a reduced amount of power 1-2, e.g., from a product of the provisional period of motor-off time 1-2, the number of disks forming the RAID (2) and an amount of power consumption of a single disk. Further, the access analyzing unit 134 calculates a sum of the reduced amounts of power 1-1 and 1-2 as a reduced amount of power 1 (S705).

Then, the access analyzing unit 134 calculates a reduced amount of power 2-1, e.g., from a product of the provisional period of motor-off time 2-1, the number of disks forming the RAID (2) and an amount of power consumption of a single disk. Further, the access analyzing unit 134 calculates a reduced amount of power 2-2, e.g., from a product of the provisional period of motor-off time 2-2, the number of disks forming the RAID (2) and an amount of power consumption of a single disk. Further, the access analyzing unit 134 calculates a sum of the reduced amounts of power 2-1 and 2-2 as a reduced amount of power 2 (S706).

Then, the access analyzing unit 134 identifies whether the reduced amount of power 1 is greater than the reduced amount of power 2 (S707). If greater (S707 Yes-identified), the access analyzing unit 134 sets the data shift origin and the data shift destination to the pool volume 1 and to the RAID (2), respectively (S708).

If the reduced amount of power 1 is equal to or smaller than the reduced amount of power 2 (S707 No-identified), the access analyzing unit 134 identifies whether the reduced amount of power 2 is greater than the reduced amount of power 1 (S709). If the reduced amount of power 2 is greater than the reduced amount of power 1 (S709 Yes-identified), the access analyzing unit 134 sets the data shift origin and the data shift destination to the pool volume 2 and to the RAID (1), respectively (S710). Go to "D" in FIG. 20 following S708 and S710.

If the reduced amount of power 2 is equal to or smaller than the reduced amount of power 1 (S709 No-identified), go to S801.

The access analyzing unit 134 identifies whether the provisional period of motor-off time 1 is longer than the provisional period of motor-off time 2 (S801). If longer (S801 Yes-identified), the access analyzing unit 134 sets the data shift origin and the data shift destination to the pool volume 1 and to the RAID (2), respectively (S802).

If the provisional period of motor-off time 1 is equal to or shorter than the provisional period of motor-off time 2 (S801 No-identified), the access analyzing unit 134 identifies whether the provisional period of motor-off time 2 is longer than the provisional period of motor-off time 1 (S803). If longer (S803 Yes-identified), the access analyzing unit 134 sets the data shift origin and the data shift destination to the pool volume 2 and to the RAID (1), respectively (S804). Go to "D" in FIG. 20 following S802 and S804.

If the provisional period of motor-off time 2 is equal to or shorter than the provisional period of motor-off time 1 (S803 No-identified), the access analyzing unit 134 identifies whether the maximum overlap indicator 1-2 is smaller than the maximum overlap indicator 2-1 (S805). If smaller (S805 Yes-identified), the access analyzing unit 134 sets the data shift origin and the data shift destination to the pool volume 1 and to the RAID (2), respectively (S802). Then, go to "D" in FIG. 20.

Unless the maximum overlap indicator 1-2 is smaller than the maximum overlap indicator 2-1 (S805 No-identified), the access analyzing unit 134 sets the data shift origin and the data shift destination to the pool volume 2 and to the RAID (1), respectively (S807). Then, go to "D" in FIG. 20.

Then, the access analyzing unit 134 identifies whether the process S601-S808 has been carried out for all the pool volumes which may potentially be a candidate for the data shift origin each (S808). If it has not been carried out for one of the pool volumes (S808 No-identified), return to "A" in FIG. 18 and carry out the process S601-S808. If all of them have been searched for (S808 Yes-identified), the ordinary analysis ends.

Carry out the process S601-S808 for every pool volume enumerated on the lists (1) and (2).

According to the storage control method using the analysis method of the third embodiment, similarly as the storage control method of the second embodiment, the storage device may suppress its power consumption to a higher degree as data may be shift more precisely for suppression of power consumption. If a quantity of pool volumes allotted to virtual volumes increases in thin provisioning, the storage devices group may effectively suppress its power consumption. Further, the servers need not be provided with a special function for a data shift. Further, the data shift does not affect the volume being recognized on the server side. Further, according to the control method of the third embodiment, a data shift which causes a RAID group of an access frequency being higher than a specific threshold to be accessed still more frequently may be prevented. Keep the access frequency lower than the specific threshold so that concentration of access to a particular RAID apparatus may be prevented and access throughput may be maintained.

According to the storage control apparatus disclosed herewith, a plurality of storage devices to which virtual volumes are set may be driven through low power consumption.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A storage system comprising:
 a plurality of RAID groups each including a plurality of storage devices;
 a controller configured to associate a plurality of logical volumes with each of the RAID groups, and to allot at least one of the plurality of logical volumes to a virtual volume; and a memory configured to store a piece of access conversion information for converting access to the virtual volume into access to the allotted logical volume, wherein the controller is configured to:
- convert the access to the logical volume into the access to the associated RAID group in response to the access to the corresponding virtual volume on the basis of the access conversion information,
- monitor frequency of access to each of the logical volumes,
- select a logical volume on the basis of the monitored frequency of access,
- move data stored in a RAID group corresponding to the selected logical volume to a different RAID group corresponding to a logical volume to be a data shift destination, and
- update the access conversion information to convert access to the RAID group corresponding to the selected logical volume into access to the different RAID group.

2. The storage system according to claim 1, wherein the controller is configured to select a logical volume with access frequency higher than a predetermined value.

3. The storage system according to claim 1, wherein the controller is configured to select a logical volume with access frequency lower than a predetermined value.

4. The storage system according to claim 1, wherein the controller power saving in each of the RAID groups in accordance with the frequency of access to the logical volumes corresponding to each of the RAID groups.

5. The storage system according to claim 4, wherein at least one of the storage devices is a hard disk drive including a disk and a spindle motor which rotates the disk, and the controller is configured to stop the spindle motor in the hard disk drive with access frequency lower than a predetermined value.

6. The storage system according to claim 4, wherein at least one of the plural storage devices is a solid state disk and the controller is configured to stop a solid state disk with access frequency lower than a specific value.

7. The storage system according to claim 1, wherein the controller is configured to:
- monitor information of an accessed logical volume and information of access time,
- analyze the information of the accessed logical volume and the information of the access time, and
- select a logical volume corresponding to a RAID group to be a data shift origin in the plural logical volumes and a logical volume of a RAID group to be a data shift destination in the plural logical volumes so that data stored in two RAID groups corresponding to two logical volumes accessed at same time are stored in one and the same RAID group.

8. The storage system according to claim 7, wherein the controller is configured to select one of the two logical volumes with the frequency of access lower than a specific threshold as a logical volume to be the data shift origin.

9. A storage control apparatus for controlling a plurality of RAID groups each including a plurality of storage devices, the storage control apparatus comprising:
- a controller configured to associate a plurality of logical volumes with each of the RAID groups, and to allot at least one of the plurality of logical volumes to a virtual volume; and
- a memory configured to store a piece of access conversion information specifying conversion of access to each of the plurality of logical volumes into access to the associated RAID group, wherein the controller is configured to:
- convert the access to the logical volume into the access to the associated RAID group in response to the access to the corresponding virtual volume on the basis of the access conversion information,
- monitor frequency of access to each of the logical volumes,
- select a logical volume on the basis of the monitored frequency of access,
- move data stored in a RAID group corresponding to the selected logical volume to a different RAID group corresponding to a logical volume to be a data shift destination, and
- update the access conversion information to convert access to the RAID group corresponding to the selected logical volume into access to the different RAID group.

10. The storage control apparatus according to claim 9, wherein the controller is configured to select a logical volume with access frequency higher than a predetermined value.

11. The storage control apparatus according to claim 9, wherein the controller is configured to select a logical volume with access frequency lower than a predetermined value.

12. The storage control apparatus according to claim 9, wherein the controller power saving in each of the RAID groups in accordance with the frequency of access to the logical volumes corresponding to each of the RAID groups.

13. The storage control apparatus according to claim 12, wherein at least one of the storage devices is a hard disk drive including a disk and a spindle motor which rotates the disk, and the controller is configured to stop the spindle motor in the hard disk drive with access frequency lower than a predetermined value.

14. The storage control apparatus according to claim 12, wherein at least one of the plural storage devices is a solid state disk and the controller is configured to stop a solid state disk with access frequency lower than a specific value.

15. The storage control apparatus according to claim 9, wherein the controller is configured to:
- monitor information of an accessed logical volume and information of access time,
- analyze the information of the accessed logical volume and the information of the access time, and
- select a logical volume corresponding to a RAID group to be a data shift origin in the plural logical volumes and a logical volume of a RAID group to be a data shift destination in the plural logical volumes so that data stored in two RAID groups corresponding to two logical volumes accessed at same time are stored in one and the same RAID group.

16. The storage control apparatus according to claim 15, wherein the controller is configured to select one of the two logical volumes with the frequency of access lower than a specific threshold as a logical volume to be the data shift origin.

17. A method for controlling a plurality of RAID groups each including a plurality of storage devices, the method comprising:
- associating a plurality of logical volumes with each of the RAID groups;
- allotting at least one of the plurality of logical volumes to a virtual volume;
- converting the access to the logical volume into the access to the associated RAID group in response to the access to the corresponding virtual volume on the basis of the access conversion information;

monitoring frequency of access to each of the logical volumes;
selecting a logical volume on the basis of the monitored frequency of access;
moving data stored in a RAID group corresponding to the selected logical volume to a different RAID group corresponding to a logical volume to be a data shift destination; and
updating the access conversion information to convert access to the RAID group corresponding to the selected logical volume into access to the different RAID group.

* * * * *

UNITED STATES PATENT AND TRADEMARK OFFICE
CERTIFICATE OF CORRECTION

PATENT NO. : 8,918,620 B2
APPLICATION NO. : 13/159853
DATED : December 23, 2014
INVENTOR(S) : Tadashi Matsumura et al.

It is certified that error appears in the above-identified patent and that said Letters Patent is hereby corrected as shown below:

In the Claims

Column 21, line 28, In Claim 4, delete "controller" and insert -- controller controls --, therefor.

Column 22, Line 26, In Claim 12, delete "controller" and insert -- controller controls --, therefor.

Signed and Sealed this
Fifth Day of May, 2015

Michelle K. Lee
*Director of the United States Patent and Trademark Office*